United States Patent
Yamakawa

(10) Patent No.: US 6,778,182 B2
(45) Date of Patent: Aug. 17, 2004

(54) DISPLAY DEVICE

(75) Inventor: Yoshifumi Yamakawa, Kanagawa (JP)

(73) Assignee: Sony Corporation, Tokyo (JP)

(*) Notice: Subject to any disclaimer, the term of this patent is extended or adjusted under 35 U.S.C. 154(b) by 20 days.

(21) Appl. No.: 09/995,398

(22) Filed: Nov. 27, 2001

(65) Prior Publication Data

US 2002/0033830 A1 Mar. 21, 2002

Related U.S. Application Data

(62) Division of application No. 09/262,105, filed on Mar. 4, 1999.

(30) Foreign Application Priority Data

Mar. 12, 1998 (JP) .......................... P10-061399
Feb. 3, 1999 (JP) .......................... P11-026514

(51) Int. Cl.$^7$ .......................... G09G 5/02; H04N 5/202; H04N 1/46
(52) U.S. Cl. .......................... 345/589; 345/22; 348/674; 348/375; 358/516; 358/519
(58) Field of Search .................. 345/589, 593, 345/597, 204, 22, 72, 83, 87; 348/514, 519–520, 527–528, 557, 560, 577, 582, 603, 612, 630, 638, 663, 674–677, 254–256; 382/162–167; 358/515, 516, 518, 519

(56) References Cited

U.S. PATENT DOCUMENTS

| | | | | |
|---|---|---|---|---|
| 4,969,045 A | * | 11/1990 | Haruki et al. ............ | 348/229.1 |
| 5,128,636 A | * | 7/1992 | Furutani et al. ........... | 333/17.2 |
| 5,519,518 A | * | 5/1996 | Watanabe et al. ............. | 349/57 |
| 5,528,514 A | * | 6/1996 | Hancock et al. ............ | 709/247 |
| 5,597,223 A | * | 1/1997 | Watanabe et al. ............. | 353/97 |
| 2002/0149598 A1 | * | 10/2002 | Greier et al. ............... | 345/589 |

* cited by examiner

Primary Examiner—Matthew C. Bella
Assistant Examiner—Wesner Sajous
(74) Attorney, Agent, or Firm—Sonnenschein Nath & Rosenthal LLP

(57) ABSTRACT

The display device is able to make an image of a dark scene to become easy to see without increasing a contrast. A composite video signal from an input terminal (1) is supplied to a separating circuit 2, in which it is separated to provide a luminance signal and two color-difference signals. The luminance signal thus separated is supplied to a dynamic gamma circuit (5). In this dynamic gamma circuit (5), its gamma correction curve between an input and an output thereof is changed in response to a control signal from a control circuit (11) in such a manner that an intermediate signal level is increased from approximately a straight line, for example. Then, the luminance signal thus gamma-corrected and two color-difference signals are converted by a converting circuit (6) into three primary color signals, and supplied through respective A/D-converting circuits (7R, 7G, 7B) to a display means (8) such as a plasma display or the like. Also, the luminance signal from the separating circuit (2) is supplied through a comparing circuit (9) to an integrating circuit (10). A signal from this integrating circuit (10) is supplied to the control circuit (11), from which there is generated a control signal whose magnitude corresponds to an average luminance level.

6 Claims, 18 Drawing Sheets

DISPLAY DEVICE

The present application is a division of application Ser. No. 09/262,105, filed Mar. 4, 1999 and claims priority to Japanese Application No. P10-061399 filed Mar. 12, 1998 and Japanese Application No. P11-026514 filed Feb. 3, 1999 which applications are incorporated herein by reference to the extent permitted by law.

BACKGROUND OF THE INVENTION

1. Field of the Invention

The present invention relates to a display device for use in displaying an image by using a display means such as a plasma display, a liquid-crystal display or the like. More particularly, this invention relates to a display device in which the whole of an image may be made easy to see by increasing an intermediate luminance level while its maximum output is held at the constant level when an average luminance level of a displayed video signal is low.

2. Description of the Related Art

Heretofore, in display devices using a display means such as a plasma display and a liquid-crystal display, a contrast of a display image is lowered when a viewer watches the displayed image in the bright circumstances, for example. In particular, when a dark scene in which an object luminance level is low is displayed, a displayed image becomes difficult to see. Contrary to this device, display devices using, for example, a cathode-ray tube have hitherto been adapted to automatically increase a contrast of a displayed image (increase an amplitude of a video signal) when a study of measured results of an average luminance level of a video signal or the like reveals that its average luminance level is lowered.

In the display devices using the plasma display or the liquid-crystal display, for example, since a dynamic range of a luminance signal of these display devices is narrow, in order to effectively utilize this narrow dynamic range, it is customary that a margin of contrast is almost removed so that the maximum value of the amplitude of the ordinary video signal is already set to the limit of the dynamic range. There is then the risk that when a contrast is increased more than that, a white peal, for example, will be over the dynamic range and will be saturated.

In a scene in which only one portion is bright in the whole of a dark object, for example, when the whole contrast is increased based on the measured results of the average luminance level, there is then the risk that the signal level of the bright portion will be over the dynamic range. As a consequence, in such scene, the video signal of the above-mentioned bright portion will be saturated to cause a so-called white compression. There is then the problem that a gradation of this bright portion cannot be expressed.

The problems that the present invention intends to solve are that an image becomes difficult to see in the scene in which the object luminance level is low and that when the whole contrast is increased, in the scene in which only one portion is bright in the whole of the dark object, for example, this bright portion becomes the so-called white compression so that the gradation of this portion cannot be expressed.

SUMMARY OF THE INVENTION

In view of the aforesaid aspect, it is an object of the present invention to provide a display device in which an average luminance signal is measured from a luminance signal or three primary color signals or digital three primary color signals and a predetermined gamma correction, controlled by the average luminance signal, is carried out so that, while a maximum output of a video signal is held at a constant level, an intermediate luminance level is increased in a scene in which an object luminance level is low to thereby make an image of a dark scene become easy to see.

According to the present invention, there is provided a display device which is comprised of a separating circuit for separating a video signal inputted in the form of an analog signal to provide a luminance signal and color-difference signals or video signal input terminals to which the luminance signal and the color-difference signals are supplied separately, a converting circuit for converting the luminance signal and the color-difference signals into three primary color signals or primary signal input terminals to which the three primary color signals are supplied independently, and an A/D-converting means for converting the three primary color signals in the form of analog to digital signals or digital input terminals to which the thus digitally-converted three primary color signals are supplied independently.

To attain the above-mentioned object, the display device according to the present invention comprises a means for measuring an average luminance level from the luminance signal or the three primary color signals or the digital three primary color signals, and a correction means having a predetermined gamma correction curve controlled by an output signal from the measuring means.

Since the gamma correction curve of the correction means is feedforward-controlled or feedback-controlled in response to the average luminance level from the measuring means, in a scene in which an object luminance level is low, an intermediate luminance level is increased to make an image of a dark scene become easy to see. In that case, since the maximum output of the video signal is held at the constant level, even in a scene in which only one portion is bright in the whole dark object, a gradation of the bright portion may be expressed satisfactorily.

According to a first aspect of the present invention, there is provided a display device including a separating circuit for separating a video signal inputted in the form of an analog signal to provide a luminance signal and color-difference signals or video signal input terminals to which the luminance signal and the color-difference signals are supplied separately, a converting circuit for converting the luminance signal and the color-difference signals into three primary color signals or primary color signal input terminals to which the three primary color signals are supplied independently, and an A/D converting means for converting the three primary color signals in the form of analog to digital signals or digital input terminals to which the digitally-converted three primary color signals are supplied independently. This display device comprises a measuring means for measuring an average luminance level of the luminance signal supplied from the separating circuit or video signal input terminal or the three primary color signals supplied from the converting circuit or the primary color signal input terminals or the digitally-converted three primary color signals supplied from the A/D converting means or digital input terminals, and a gamma correction means having a gamma correction curve controlled by an output control signal from the measuring means.

According to a second aspect of the present invention, in the above-mentioned display device, the measuring means includes a comparing means for being supplied with an analog luminance signal from the separating circuit or the video signal input terminals and for comparing the analog luminance signal with a predetermined level, an integrating circuit for integrating an output from the comparing circuit, and a control circuit for generating an output control signal based on an integrated value from the integrating circuit.

According to a third aspect of the present invention, in the above-mentioned display device, the measuring means includes an analog luminance signal generating circuit for being supplied with analog three primary color signals from the converting circuit or the primary color signal input terminals and for generating an analog luminance signal by adding the three primary color signals with a predetermined ratio, a comparing circuit for comparing the generated analog luminance signal with a predetermined level, an integrating circuit for integrating an output from the comparing circuit, and a control circuit for generating an output control signal based on an integrated value from the integrating circuit.

According to a fourth aspect of the present invention, in the above-mentioned display device, the measuring means includes a digital luminance signal generating circuit for being supplied with the digitally-converted three primary color signals from the A/D converting means or the digital input terminals and for generating a digital luminance signal by adding the digitally-converted three primary color signals with a predetermined ratio, a comparing circuit for comparing the generated digital luminance signal with a predetermined level, an integrating circuit for integrating an output from the integrating circuit, and a control circuit for generating an output control signal based on an integrated value from the integrating circuit.

According to a fifth aspect of the present invention, in the above mentioned display device, the gamma correction curve of the gamma correction means has a control characteristic such that the gamma correction curve is made approximately a straight line when the level of the output control signal from the measuring means is large and that an intermediate signal level is increased as the level of the output control signal from the measuring means is lowered.

According to a sixth aspect of the present invention, in the above-mentioned display device, the gamma correction means is provided with respect to the analog luminance signal supplied from the separating circuit or the video signal input terminals, the output control signal from the measuring means is generated based on the analog luminance signal from the separating circuit or the video signal input terminals and the gamma correction means is feedforward-controlled by the output control signal from the measuring means.

According to a seventh aspect of the present invention, in the above-mentioned display device, the gamma correction means is provided with respect to the analog luminance signal supplied from the separating circuit or the video signal input terminals, the output control signal from the measuring means is generated based on the analog luminance signal outputted from the gamma correction means and the gamma correction means is feedback-controlled by the output control signal from the measuring means.

According to an eight aspect-of the present invention, in the above-mentioned display device, the gamma correction means is provided with respect to the analog luminance signal supplied from the separating circuit or the video signal input terminals, the output control signal from the measuring means is generated based on the analog three primary color signals outputted from the converting circuit and the gamma correction means is feedback-controlled by the output control signal from the measuring means.

According to a ninth aspect of the present invention, in the above-mentioned display device, the gamma correction means is provided with respect to the analog luminance signal from the separating circuit or the video signal input terminals, the output control signal supplied from the measuring means is generated based on the digitally-converted three primary color signals outputted from an A/D converting means and the gamma correction means is feedback-controlled by the output control signal from the measuring means.

According to a tenth aspect of the present invention, in the above-mentioned display device, the gamma correction means is provided with respect to the analog luminance signal supplied from the separating circuit or the video signal input terminals, and also provided with a color gain control means in order to control levels of two color-difference signals comprising the video signal in response to the measured average luminance level, the output control signal from the measuring means is generated based on the analog luminance signal supplied from the separating circuit or the video signal input terminals, and the gamma correction means and the color gain control means are feedforward-controlled by the output control signal from the measuring means.

According to an eleventh aspect of the present invention, in the above-mentioned display device, the gamma correction means is provided with respect to the analog luminance signal supplied from the separating circuit or the video signal input terminals, also provided with a color gain control means in order to control levels of two color-difference signals comprising the video signal in response to the measured average luminance level, the output control signal from the measuring means is generated based on the analog luminance signal supplied from the gamma correction means, and the gamma correction means and the color gain control means are feedback-controlled by the output control signal from the measuring means.

According to a twelfth aspect of the present invention, in the above-mentioned display device, the gamma correction means is provided with respect to the analog luminance signal supplied from the separating circuit or the video signal input terminals, also provided with a color gain control means in order to control levels of two color-difference signals comprising the video signal in response to the measured average luminance level, the output control signal from the measuring means is generated based on the analog three primary color signals outputted from the converting means and the gamma correction means and the color gain control means are feedback-controlled by the output control signal from the measuring means.

According to a thirteenth aspect of the present invention, in the above-mentioned display device, the gamma correction means is provided with respect to the analog luminance signal supplied from the separating circuit or the video signal input terminals, also provided with a color gain control means in order to control levels of two color-difference signals comprising the video signal in response to the measured average luminance level, the output control signal from the measuring means is generated based on the digitally-converted three primary color signals outputted from the A/D converting means, and the gamma correction means and the color gain control means are feedback-controlled by the output control signal from the measuring means.

According to a fourteenth aspect of the present invention, in the above-mentioned display device, the gamma correction means are provided with respect to respective three primary color signals outputted from the converting circuit, the output control signal from the measuring means is generated based on the analog luminance signal supplied from the separating circuit or the video signal input terminals, and the gamma correction means are respectively feedforward-controlled by the output control signal from the measuring means.

According to a fifteenth aspect of the present invention, in the above-mentioned display device, the gamma correction means are provided with respect to the respective three primary color signals outputted from the converting circuit or the primary color signal input terminals, the output control signal from the measuring means is generated based on the analog three primary color signals supplied from the converting circuit or the primary color signal input terminals, and the gamma correction means are respectively feedforward-controlled by the output control signal from the measuring means.

According to a sixteenth aspect of the present invention, in the above-mentioned display device, the gamma correction means are provided with respect to the respective three primary color signals supplied from the converting circuit or the primary color signal input terminals, the output control signal from the measuring means is generated based on the analog three primary color signals outputted from the gamma correction means, and the gamma correction means are respectively feedback-controlled by the output control signal from the measuring means.

According to a seventeenth aspect of the present invention, in the above-mentioned display device, the gamma correction means are provided with respect to the respective three primary color signals supplied from the converting circuit or the primary color signal input terminals, the output control signal from the measuring means is generated based on the digitally-converted three primary color signals outputted from the A/D converting means, and the gamma correction means are respectively feedback-controlled by the output control signal from the measuring means.

According to an eighteenth aspect of the present invention, in the above-mentioned display device, the gamma correction means are provided with respect to the respective digitally-converted three primary color signals outputted from the A/D converting means, the output control signal from the measuring means is generated based on the analog luminance signal supplied from the separating circuit or the video signal input terminals, and the gamma correction means are respectively feedforward-controlled by the output control signal from the measuring means.

According to a nineteenth aspect of the present invention, in the above-mentioned display device, the gamma correction means are provided with respect to the respective digitally-converted three primary color signals outputted from the A/D converting means, the output control signal from the measuring means is generated based on the analog three primary color signals supplied from the converting circuit or the primary color input terminals, and the gamma correction means are respectively feedforward-controlled by the output control signal from the measuring means.

According to a twentieth aspect of the present invention, in the above-mentioned display device, the gamma correction means are provided with respect to the respective digitally-converted three primary color signals supplied from the A/D converting means or the digital input terminals, the output control signal from the measuring means is generated based on the digitally-converted three primary color signals supplied from the A/D converting means or the digital input terminals, and the gamma correction means are respectively feedforward-controlled by the output control signal from the measuring means.

In accordance with a twenty-first aspect of the present invention, in the above-mentioned display device, the gamma correction means are provided with respect to the respective three primary color signals supplied from the A/D converting means or the digital input terminals, the output control signal from the measuring means is generated based on the digital three primary color signals outputted from the gamma correction means, and the gamma correction means are respectively feedback-controlled by the output control signal from the measuring means.

DESCRIPTION OF THE PREFERRED EMBODIMENTS

The present invention will hereinafter be described with reference to the accompanying drawings.

Figure 1:
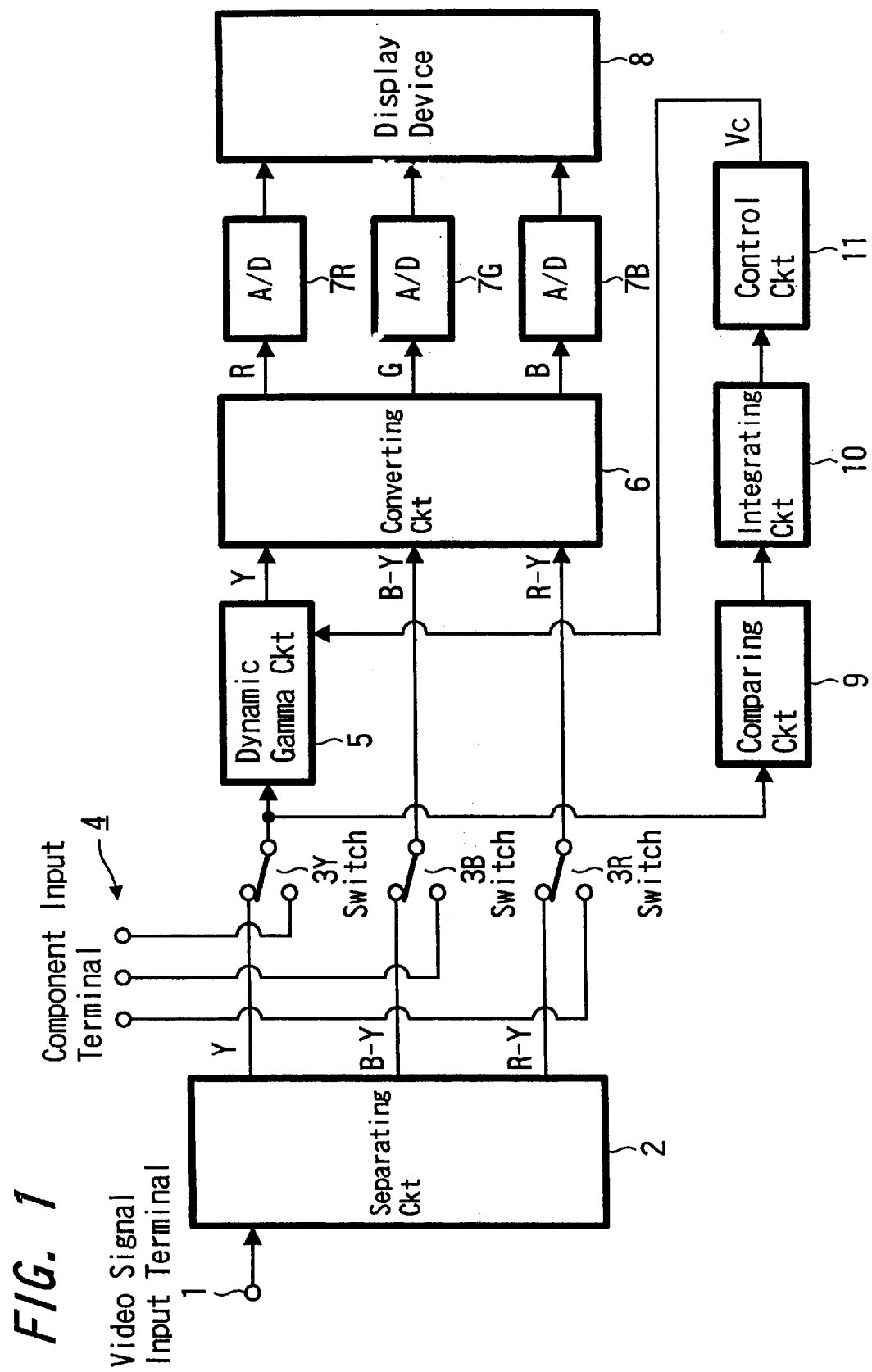
FIG. 1 is a block diagram showing a display device according to a first embodiment of the present invention.

FIG. 1 of the accompanying drawings is a block diagram showing a display device according to a first embodiment of the present invention.

Referring to FIG. 1, the display device includes an input terminal 1 to which there is supplied a composite video signal (video signal), for example. The composite video signal from this input terminal 1 is supplied to a separating circuit 2 which separates the composite video signal, for example, to provide a luminance signal (Y) and two color-difference signals (R−Y), (B−Y). The luminance signal (Y) and the two color-difference signals (R−Y) and (B−Y) separated by the separating circuit 2 are supplied to change-over switches 3Y, 3R, 3B, in which they are switched from signals supplied from an input terminal (component input terminal) 4 to which a luminance signal (Y) and two color-difference signals (R−Y), (B−Y), for example, are supplied, respectively.

Figure 2:
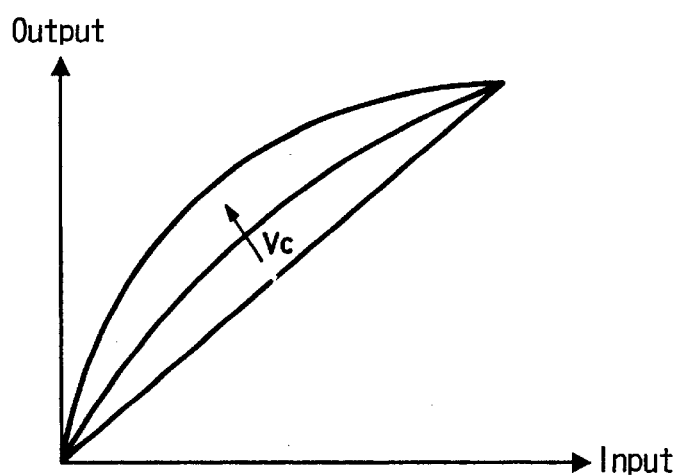
FIG. 2 is a characteristic graph used to explain an operation of the display device according to the present invention shown in FIG. 1.

The luminance signal (Y) from this change-over switch 3Y is supplied to a gamma correction device (dynamic gamma circuit) 5 having a gamma correction curve that is controlled by an output control signal Vc from a control circuit 11 which will be described later on. The dynamic control circuit 5 is controlled by the output control signal Vc from the control circuit 11, which will be described later on, in such a manner that a gamma correction curve between an input and output thereof, for example, is presented as shown in FIG. 2, for example. Specifically, the dynamic control circuit 5 is controlled in response to the level of the output control signal Vc in such a manner that the intermediate signal level of the input and output correction curve is increased from approximately a straight line as shown by an arrow in FIG. 2, for example.

Further, the corrected luminance signal (Y) from the dynamic gamma circuit 5 and the two color-difference signals (R−Y), (B−Y) from the above-mentioned change-over switches 3R, 3B are respectively supplied to a converting circuit 6, in which they are converted into three primary color signals of red (R), green (G), blue (B), for example. The three primary color signals (R/G/B) thus converted by this converting circuit 6 are respectively supplied to A/D (analog-to-digital) converting circuits 7R, 7G, 7B, and resultant digital three primary color signals (R/G/B) are supplied from the A/D converting circuits 7R, 7G, 7B to a display device 8 such as a plasma display and a liquid-crystal display.

On the other hand, the luminance signal (Y) from the change-over switch 3Y is supplied to a comparing circuit 9, which compares a supplied signal with an arbitrary reference level, and thereby converted into a square-wave signal which goes to "0" when it is higher than the reference level and which goes to "1" when it is lower than the reference level. This square-wave signal is integrated by an integrating circuit 10 in which generated is a signal indicative of an average luminance signal of the above-mentioned luminance signal (Y). Incidentally, this integrating circuit 10 is of a 5V-system circuit, for example. Therefore, the signal thus generated is supplied to the control circuit 11 which effects the voltage-conversion from 5V to 12V, for example, in order to establish an electrical interface between the integrating circuit 10 and the dynamic gamma circuit 5. Then, the output control signal Vc thus voltage-converted by this control circuit 11 is supplied to the dynamic gamma circuit 5.

In this manner, in this display device, the average luminance level of the luminance signal (Y) supplied from the separating circuit 2, for example, or the component input terminal 4 through the change-over switch 3Y is measured by the measuring means comprising the comparing circuit 9 to the control circuit 11. Further, the output control signal Vc corresponding to the average luminance level measured by this measuring means is supplied from the control circuit 11 to the dynamic gamma circuit 5. Then, the gamma correction curve of the above-mentioned dynamic gamma circuit 5 is feedforward-controlled in such a fashion that the gamma correction curve between input and output is presented as approximately a straight line when the average luminance level, for example, is large and that the intermediate signal level, for example, of the gamma correction between input and output is increased when the average luminance level is low.

Accordingly, since this display device includes the measuring means for measuring the average luminance level of the video signal to be displayed and the gamma correction means controlled by the output control signal from this measuring means, the gamma correction curve is controlled in response to the average luminance level of the displayed video signal, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

In the conventional display device, it is frequently observed that an image becomes difficult to see in the scene in which a luminance level of an object, for example, is low. To solve this problem, when a contrast in the whole of the object is increased, even in the scene in which one portion is bright in the whole of the dark object, for example, this bright portion becomes a so-called white compression. There then arises a problem that the gradation of this portion cannot b expressed. According to the present invention, these problems may be solved with ease.

Figure 3:
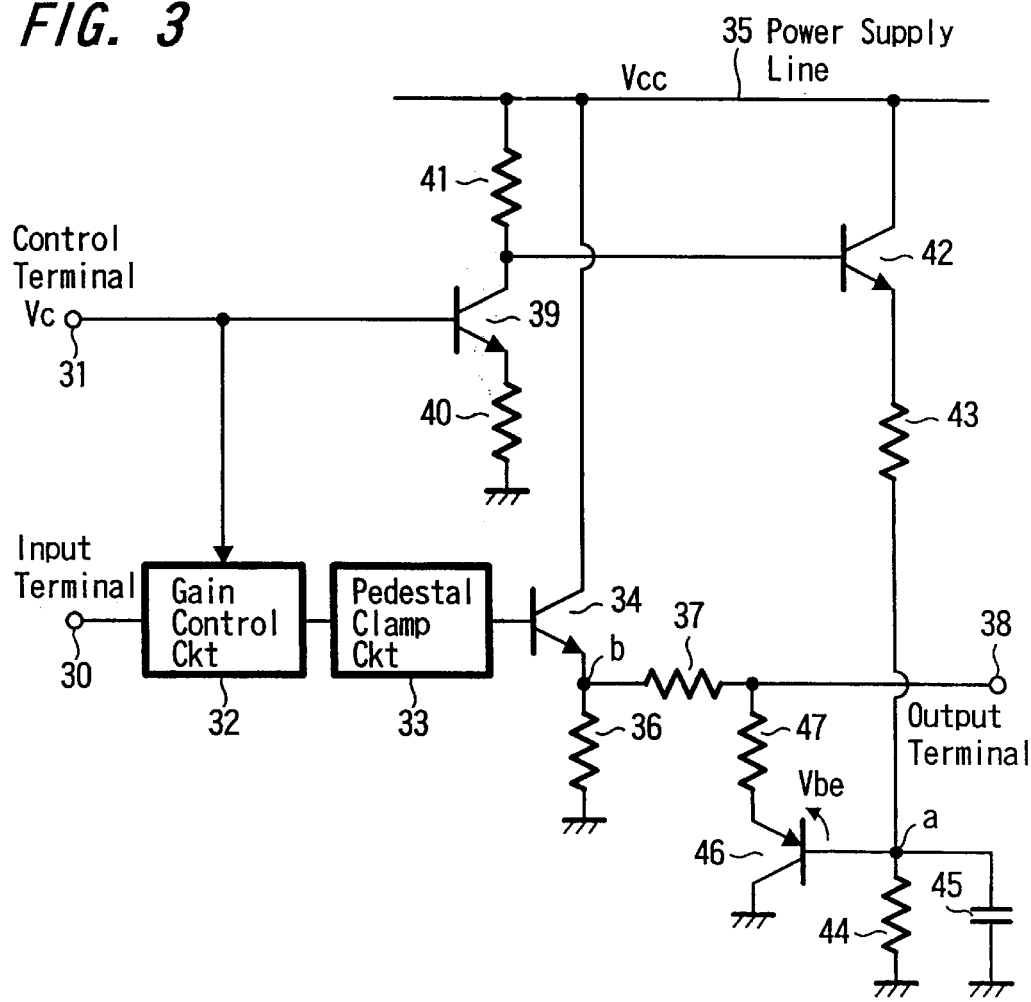
FIG. 3 is a circuit diagram showing a main portion of the display device according to the present invention shown in FIG. 1.

FIG. 3 shows an example of a specific circuit arrangement that can realize the above-mentioned dynamic gamma circuit 5. As shown in FIG. 3, the luminance signal (Y) from the above-mentioned change-over switch 3Y, for example, is supplied to an input terminal 30. The output control signal (voltage) Vc is supplied from the above-mentioned control circuit 11 to a control terminal 31. Then, the luminance signal (Y) supplied to the input terminal 30 is supplied to a gain control circuit 32 which is controlled by the above-mentioned output control signal Vc, for example, and a signal from this gain control circuit 32 is supplied to a pedestal clamp circuit 33.

An output terminal of this pedestal clamp circuit 33 is connected to the base of an npn-type transistor 34. The collector of this transistor 34 is connected to a power-supply line 35 of a power supply Vcc. The emitter of this transistor 34 is connected to the ground through a resistor 36, and an output terminal 38 is led out from the emitter of this transistor 34 through a resistor 37.

On the other hand, the control terminal 31 to which the above-mentioned output control signal (voltage) Vc is supplied is connected to the base of an npn-type transistor 39. Then, the emitter of this transistor 39 is connected to the ground through a resistor 40. Also, the collector of this transistor 39 is connected to the power-supply line 35 of the power supply Vcc through a resistor 41. The collector of this transistor 39 is connected to the base of an npn-type transistor 42.

Further, the collector of this transistor 42 is connected to the power-supply line 35 of the power-supply Vcc. Also, the emitter of this transistor 42 is connected through a resistor 43 to an integrating circuit comprising a resistor 44 and a capacitor 45. Further, a junction (a) between the resistor 43 and the integrating circuit is connected to the base of a pnp-type transistor 46. Then, the collector of this transistor 46 is connected to the ground, and the emitter of this transistor 46 is connected through a resistor 47 to a junction between the resistor 37 and the output terminal 38.

In this circuit shown in FIG. 3, the above-mentioned gain control circuit 32 has such an arrangement that the gain of the input and output characteristic increases as the output control signal (voltage) Vc increases, for example. Then, the luminance signal (Y) supplied to the input terminal 30 is supplied through this gain control circuit 32 to the pedestal clamp circuit 33. The video signal whose pedestal is clamped by this pedestal clamp circuit 33 is supplied through an emitter-follower of the transistor 34 to a "polygonal line circuit" comprising the resistors 37, 47 and the transistor 46.

In this "polygonal line circuit", if the signal level at the emitter (junction b) of the transistor 34 is lower than [voltage at the above-mentioned junction a+base-emitter voltage Vbe of the transistor 46], then although the transistor 46 is turned off, the signal level at the junction b is developed at the output terminal 38 as it is. On the other hand, if the signal level at the junction b becomes higher than [voltage at the above-mentioned junction a+base-emitter voltage Vbe of the transistor 46], then the transistor 46 is turned on so that the signal level at the junction b is divided by the resistors 37, 47 and then developed at the output terminal 38.

Specifically, in this "polygonal line circuit", when the signal level at the junction b is lower than [voltage at the above-mentioned junction a+base-emitter voltage Vbe of the transistor 46], the gain thereof becomes "1". When this signal level becomes higher than the above-mentioned voltage, the gain thereof becomes smaller than "1" that is determined by the resistance ratio between the resistors 37, 47 with the result that the input and output characteristic is bent at the point of the [voltage at the above-mentioned junction a+base-emitter voltage Vbe of the transistor 46].

An operation of the circuit shown in FIG. 3 will be described below. When the correction is not carried out since the output control signal Vc is not supplied to the control terminal 31, the signal supplied to the input terminal 30 is outputted to the output terminal 38 as it is. On the other hand, when the voltage of the output control signal Vc supplied to the control terminal 31 increases, the circuit comprised of the transistors 39, 42 and the resistors 40, 41, 43, 44 lowers the voltage at the junction a to cause the input and output characteristic to be bent at the portion in which the signal level is high.

Further, when the voltage of the output control signal Vc is increased, then the gain of the portion in which the signal level is low is increased by the gain control circuit 32. At the same time, the signal level obtained at the portion in which the input and output characteristic is bent is lowered so that the gain of the portion above that point is decreased. Thus, there is generated an input and output characteristic shown in FIG. 4, for example.

Figure 4:
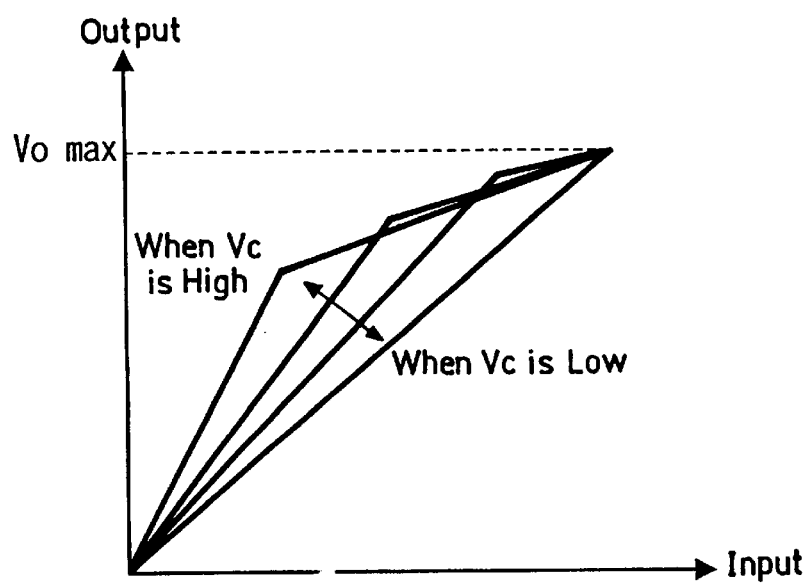
FIG. 4 is a characteristic graph used to explain an operation of the circuit diagram shown in FIG. 3.

That is, in the circuit shown in FIG. 3, if the voltage of the output control signal Vc is increased progressively, then the gamma correction curve between input and output is controlled in such a manner that its intermediate signal level is increased from approximately a straight line as shown by the arrow in FIG. 4. Also, at that time, by the cooperation of the gain control circuit 32 and the polygonal line circuit, it is possible to hold the maximum value Vomax of the output level, for example, at the constant level.

Accordingly, in this circuit, while the maximum value Vomax of the output level is held at the constant level, the polygonal points may be moved in unison with the gain and the intermediate luminance level may be changed dynamically, thereby making it possible to effect the correction without damaging the gradation of the white peak. Moreover, this circuit does not need any special integrated circuit and a complex circuit or the like so that this circuit may be realized by a simple arrangement at a low cost.

Figure 5:
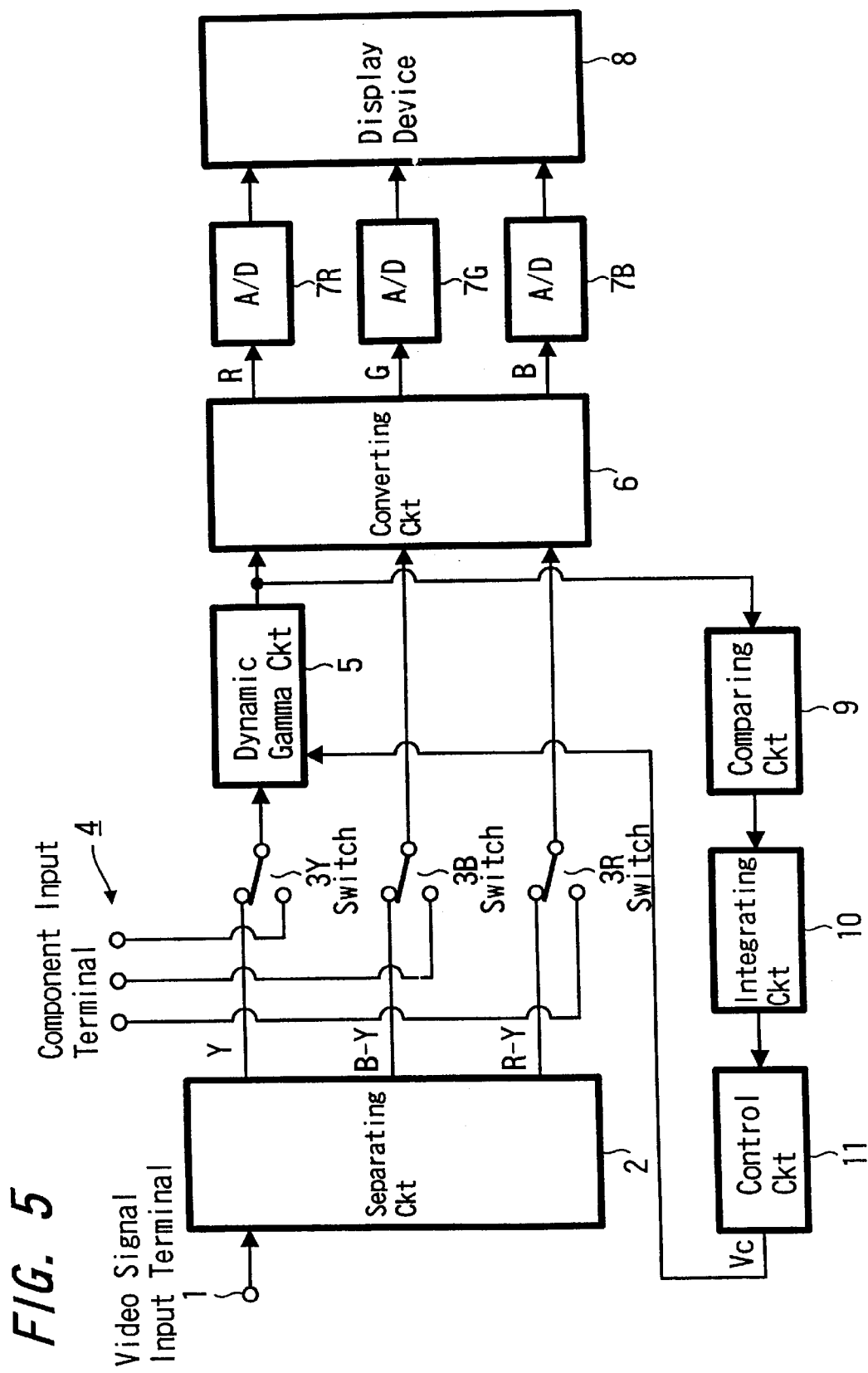
FIG. 5 is a block diagram showing a display device according to a second embodiment of the present invention.

FIG. 5 is a block diagram showing a display device according to a second embodiment of the present invention.

Referring to FIG. 5, the display device includes an input terminal 1 to which there is supplied a composite video signal (video signal), for example. The composite video signal from this input terminal 1 is supplied to a separating circuit 2 which separates the composite video signal, for example, to provide a luminance signal (Y) and two color-difference signals (R–Y), (B–Y). The luminance signal (Y) and the two color-difference signals (R–Y) and (B–Y) separated by the separating circuit 2 are supplied to change-over switches 3Y, 3R, 3B, in which they are switched from signals supplied from an input terminal (component input terminal) 4 to which a luminance signal (Y) and two color-difference signals (R–Y), (B–Y), for example, are supplied, respectively.

The luminance signal (Y) from this change-over switch 3Y is supplied to a gamma correction device (dynamic gamma circuit) 5 having a gamma correction curve that is controlled by an output control signal Vc from a control circuit 11 which will be described later on. The dynamic control circuit 5 is controlled by the output control signal Vc from the control circuit 11, which will be described later on, in such a manner that an input and output gamma correction curve, for example, is presented as shown in FIG. 2, for example. Specifically, the dynamic control circuit 5 is controlled by the output control signal Vc in such a manner that the intermediate signal level of the gamma correction curve between input and output is increased from approximately a straight line as shown by an arrow in FIG. 2, for example.

Further, the corrected luminance signal (Y) from the dynamic gamma circuit 5 and the two color-difference signals (R–Y), (B–Y) from the above-mentioned change-over switches 3R, 3B are all supplied to a converting circuit 6, in which they are converted into three primary color signals of red (R), green (G), blue (B), for example. The three primary color signals (R/G/B) thus converted by this converting circuit 6 are respectively supplied to A/D (analog-to-digital) converting circuits 7R, 7G, 7B, and resultant digital three primary color signals (R/G/B) are supplied from the A/D converting circuits 7R, 7G, 7B to a display device 8 such as a plasma display or a liquid-crystal display.

Further, the luminance signal (Y) from the dynamic gamma circuit 5 is supplied to a comparing circuit 9 to be compared with an arbitrary reference level and thereby converted into a square-wave signal which goes to "0" when it is higher than the reference level and which goes to "1" when it is lower than the reference level. This square-wave signal is integrated by an integrating circuit 10 and thereby generated as the signal indicative of the average luminance signal of the above-mentioned luminance signal (Y). Incidentally, this integrating circuit 10 is of a 5V-system circuit, for example. Therefore, the signal thus generated is supplied to a control circuit 11 which effects the voltage-conversion from 5V to 12V, for example, in order to establish an electrical interface between the integrating circuit 10 and the dynamic gamma circuit 5. Then, the output control signal Vc thus voltage-converted by this control circuit 11 is supplied to the dynamic gamma circuit 5.

In this manner, in this display device, the average luminance level of the luminance signal (Y) outputted from the dynamic gamma circuit 5 is measured by the measuring means comprising the comparing circuit 9 to the control circuit 11. Further, the output control signal Vc corresponding to the average luminance level measured by this measuring means is supplied from the control circuit 11 to the dynamic gamma circuit 5. Then, the gamma correction curve of the above-mentioned dynamic gamma circuit 5 is feedback-controlled in such a fashion that the gamma correction between input and output becomes approximately a straight line when the average luminance level is large and that the intermediate signal level, for example, is increased when the average luminance level becomes small.

Accordingly, since this display device includes the measuring means for measuring the average luminance level of the video signal to be displayed and the gamma correction means controlled by the output control signal from this measuring means, the gamma correction curve is controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Figure 6:
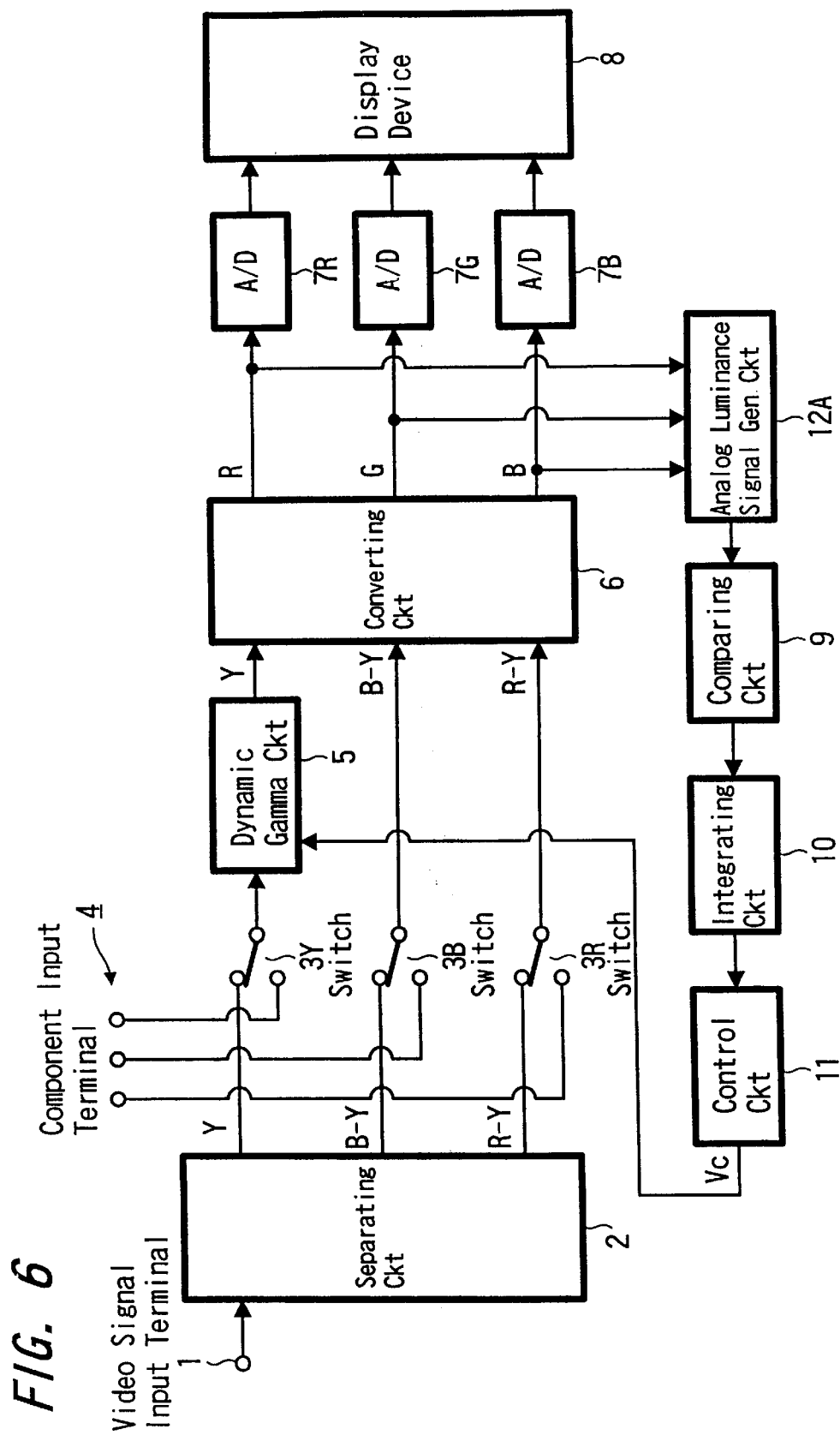
FIG. 6 is a block diagram showing a display device according to a third embodiment of the present invention.

FIG. 6 is a block diagram showing a display device according to a third embodiment of the present invention.

As shown in FIG. 6, the display device includes an input terminal 1 to which a composite video signal (video signal), for example, is supplied. The composite video signal from this input terminal 1 is supplied to a separating circuit 2 which separates the composite video signal, for example, to provide a luminance signal (Y) and two color-difference signals (R–Y), (B–Y). Further, the luminance signal (Y) and the two color-difference signals (R–Y), (B–Y) separated by this separating circuit 2 are respectively supplied to change-over switches 3Y, 3R, 3B, in which they are respectively switched from the signals from an input terminal (component input terminal) 4 to which the luminance signal (Y) and the two color-difference signals (R–Y), (B–Y) are supplied respectively.

The luminance signal (Y) from this change-over switch 3Y is supplied to a gamma correction means (dynamic gamma circuit) 5 having a gamma correction curve controlled by an output control circuit 11 which will be described later on. In the dynamic gamma circuit 5, a gamma correction characteristic curve between its input and output, for example, is controlled by the output control signal Vc from the control circuit 11, which will be described later on, in such a way as shown in FIG. 2, for example. That is, the correction curve between the input and output thereof is controlled as shown by the arrow in FIG. 2 in response to the magnitude of the output control signal Vc in such a manner that the intermediate signal level is increased from approximately a straight line.

Further, the corrected luminance signal (Y) from the dynamic gamma circuit 5 and the two color-difference signals (R–Y), (B–Y) from the above-mentioned change-over switches 3R, 3B are all supplied to a converting circuit 6, in which they are converted into three primary color signals of red (R), green (G), blue (B). Then, the three primary color signals (R/G/B) thus converted by this converting circuit 6 are respectively supplied to A/D converting circuits 7R, 7G, 7B from which the three primary color signals (R/G/B) thus digitally-converted are supplied to a display means 8 such as a plasma display or a liquid-crystal display.

Also, the three primary color signals (R/G/B) thus converted by the above-mentioned converting circuit 6 are supplied to an analog luminance signal generating circuit 12A. This luminance signal generating circuit 12A generates a luminance signal (Y) by adding the three primary color signals (R/G/B) with a predetermined ratio, e.g. at a ratio of Y=0.30R+0.59G+0.11B in the case of the NTSC system. The thus generated luminance signal (Y) is supplied to a comparing circuit 9, which compares a supplied luminance signal with an arbitrary reference level, and thereby converted into a square-wave signal which goes to "0" when it is higher than the reference level and which goes to "1" when it is lower than the reference level.

Further, an integrating circuit 10 integrates this square-wave signal to generate a signal indicative of the average luminance level of the above-mentioned luminance signal (Y). Incidentally, this integrating circuit 10 is of a 5V-system circuit, for example. Accordingly, the above-mentioned generated signal is supplied to the control circuit 11 which effects the voltage-conversion from 5V to 12V, for example, in order to establish an electrical interface between the above-mentioned dynamic gamma circuit 5 and the integrating circuit 10. Then, the output control signal Vc thus voltage-converted by this control circuit 11 is supplied to the dynamic gamma circuit 5.

As described above, according to this display device, the luminance signal Y is generated from the three primary color signals (R/G/B) converted by the converting circuit 6, and the average luminance level of this luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuit 5. Then, the gamma correction curve of the above-mentioned dynamic gamma circuit 5 is feedback-controlled in such a manner that the gamma correction between input and output becomes approximately a straight line when the average luminance level, for example, is large and that the intermediate signal level, for example, is increased when the average luminance level becomes small.

Accordingly, since this display device includes the measuring means for measuring the average luminance level of the video signal to be displayed and the gamma correction means controlled by the output control signal from this measuring means, the gamma correction curve is controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Figure 7:
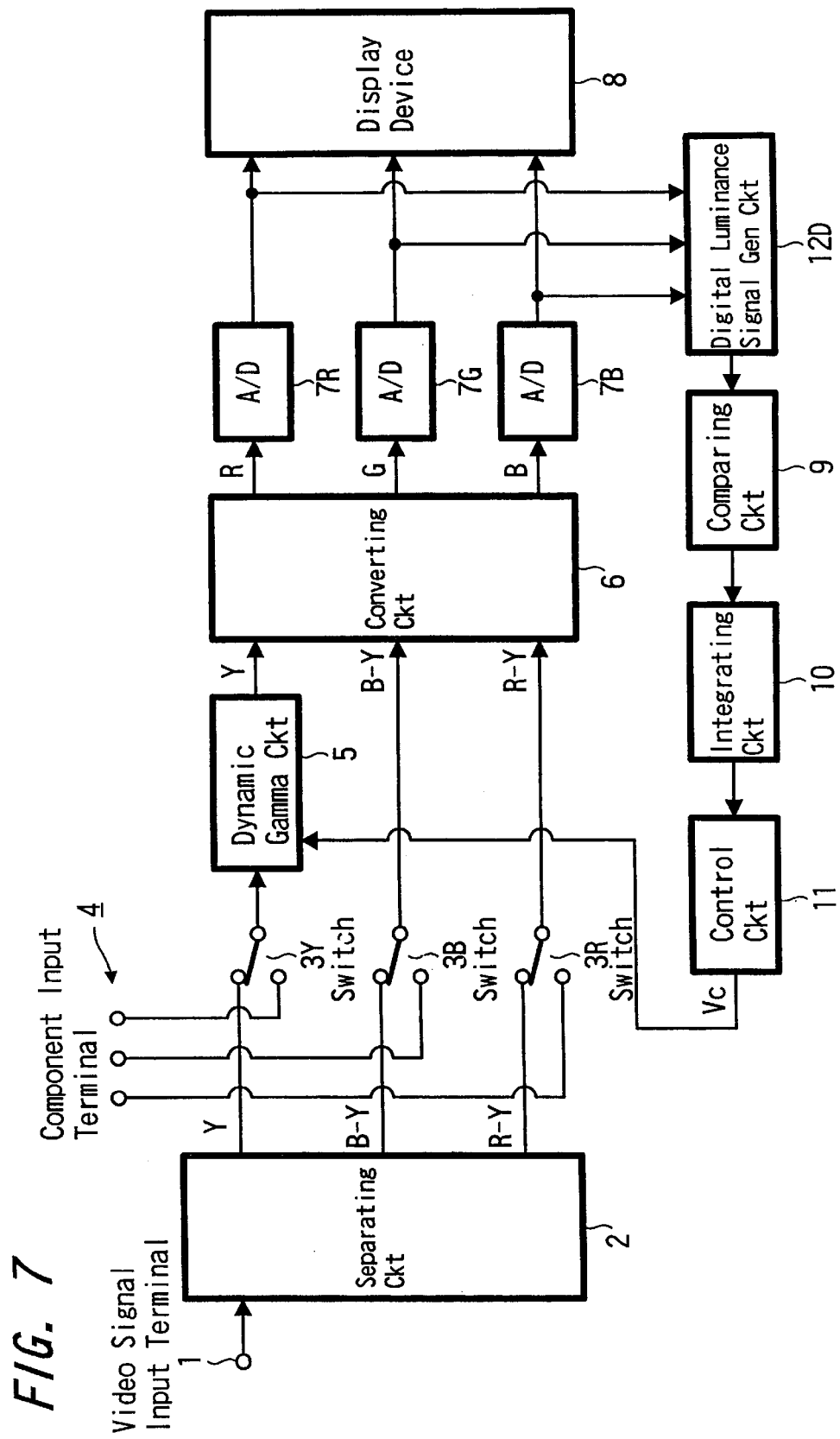
FIG. 7 is a block diagram showing a display device according to a fourth embodiment of the present invention.

FIG. 7 is a block diagram showing a display device according to a fourth embodiment of the present invention.

As shown in FIG. 7, the display device includes an input terminal 1 to which a composite video signal (video signal), for example, is supplied. The composite video signal from this input terminal 1 is supplied to a separating circuit 2 which separates the composite video signal, for example, to provide a luminance signal (Y) and two color-difference signals (R–Y), (B–Y). Further, the luminance signal (Y) and the two color-difference signals (R–Y), (B–Y) separated by this separating circuit 2 are supplied to change-over switches 3Y, 3R, 3B, in which they are respectively switched from the signals from an input terminal (component input terminal) 4 to which the luminance signal (Y) and the two color-difference signals (R–Y), (B–Y) are supplied respectively.

The luminance signal (Y) from this change-over switch 3Y is supplied to a gamma correction means (dynamic gamma circuit) 5 having a gamma correction curve controlled by the output control signal Vc from an output control circuit 11 which will be described later on. In the dynamic gamma circuit 5, a gamma correction characteristic curve between its input and output, for example, is controlled by the output control signal Vc from the control circuit 11, which will be described later on, in such a way as shown in FIG. 2, for example. That is, the gamma correction curve between input and output is controlled as shown by the arrow in FIG. 2 in response to the magnitude of the output control signal Vc in such a manner that the intermediate signal level is increased from approximately a straight line.

Further, the corrected luminance signal (Y) from the dynamic gamma circuit 5 and the two color-difference signals (R–Y), (B–Y) from the above-mentioned change-over switches 3R, 3B are all supplied to a converting circuit 6, in which they are converted into three primary color signals of red (R), green (G), blue (B), for example. Then, the three primary color signals (R/G/B) thus converted by this converting circuit 6 are respectively supplied to A/D converting circuits 7R, 7G, 7B from which the three primary color signals (R/G/B) thus digitally-converted are supplied to a display means 8 such as a plasma display or a liquid-crystal display.

Also, the three primary color signals (R/G/B) thus digitally converted by the above-mentioned A/D converting circuits 7R, 7G, 7B are supplied to a digital luminance signal generating circuit 12D. The three primary color signals (R/G/B) outputted from the A/D converting circuits 7R, 7G, 7B are digital signals in which a sampling frequency, for example, is 30 MHz and the quantization bit number is 8 bits (quantization value ranges from 0 to 255). This luminance signal generating circuit 12D generates a luminance signal (Y) by adding the three primary color signals (R/G/B) with a predetermined ratio, e.g. at a ratio of Y=0.30R+0.59G+0.11B in the case of the NTSC system.

The thus generated luminance signal (Y: digital value) is supplied to a comparing circuit 9, which compares a supplied luminance signal with an arbitrary reference level, e.g. quantization value 100, and thereby converted into a square-wave signal which goes to "0" when it is higher than the reference level and which goes to "1" when it is lower than the reference level. An integrating circuit 10 integrates this square-wave signal to generate a signal (analog value) indicative of the average luminance level of the above-mentioned luminance signal (Y). Incidentally, this integrating circuit 10 is of the 5V-system circuit, for example. Accordingly, the above-mentioned generated signal is supplied to the control circuit 11 which effects the voltage-conversion from 5V to 12V, for example, in order to establish the electrical interface between the above-mentioned dynamic gamma circuit 5 and the integrating circuit 10. Then, the output control signal Vc thus voltage-converted by this control circuit 11 is supplied to the dynamic gamma circuit 5.

As described above, according to this display device, the luminance signal (Y: digital value) is generated from the three primary color signals (R/G/B) thus converted by the A/D converting circuits 7R, 7G, 7B, and the average luminance level (analog value) of the luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuit 5. Then, the gamma correction curve of the above-mentioned dynamic gamma circuit 5 is feedback-controlled in such a manner that the gamma correction between input and output becomes approximately a straight line when the average luminance level, for example, is large and that the intermediate signal level, for example, is increased when the average luminance level becomes small.

Accordingly, since this display device includes the measuring means for measuring the average luminance level of the video signal to be displayed and the gamma correction means controlled by the output control signal from this measuring means, the gamma correction curve is controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

In the above-mentioned apparatus, by the way, since the signal levels are related to not the brightness but a color saturation degree with respect to the two color-difference signals (R–Y) and (B–Y), the two color-difference signals (R–Y) and (B–Y) cannot be processed by the gamma correction similarly to the luminance signal (Y). However, it is considered that when only the luminance signal (Y) is increased by the correction, for example, the color saturation degree is lowered relatively to thereby cause colors to become plain. Therefore, with respect to the two color-difference signals (R–Y) and (B–Y), by the provision of a color gain control circuit in which the gain of input and output characteristics is increased as the control signal (voltage) Vc, for example, is increased, it is possible to solve the problem in which the color saturation degree is lowered relatively.

Figure 8:
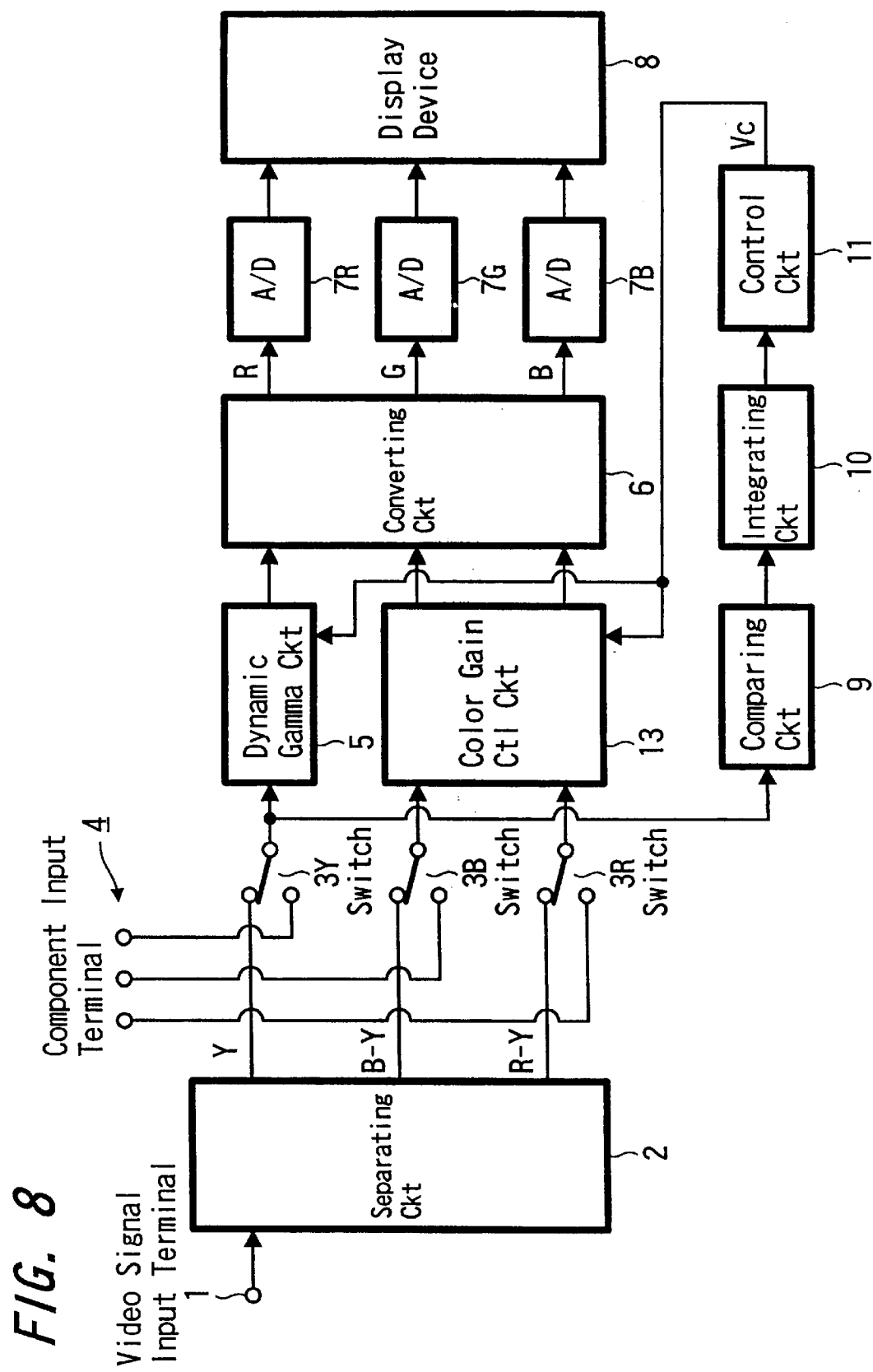
FIG. 8 is a block diagram showing a display device according to a fifth embodiment of the present invention.

FIG. 8 is a block diagram showing a display device including such a color gain control circuit according to a fifth embodiment of the present invention.

As shown in FIG. 8, the display device includes an input terminal 1 to which a composite video signal (video signal), for example, is supplied. The composite video signal from this input terminal 1 is supplied to a separating circuit 2 which separates the composite video signal, for example, to provide a luminance signal (Y) and two color-difference signals (R–Y), (B–Y). Further, the luminance signal (Y) and the two color-difference signals (R–Y), (B–Y) separated by this separating circuit 2 are respectively supplied to change-over switches 3Y, 3R, 3B, in which they are respectively switched from the signals from an input terminal (component input terminal) 4 to which the luminance signal (Y) and the two color-difference signals (R–Y), (B–Y) are supplied respectively The luminance signal (Y) from this change-over switch 3Y is supplied to a gamma correction means (dynamic gamma circuit) 5 having a gamma correction curve controlled by an output control signal Vc from an output control circuit 11 which will be described later on. In the dynamic gamma circuit 5, a gamma correction characteristic curve between its input and output, for example, is controlled by the output control signal Vc from the control circuit 11, which will be described later on, in such a way as shown in FIG. 2, for example. That is, the gamma correction curve between input and output is controlled as shown by the arrow in FIG. 2 in response to the magnitude of the output control signal Vc in such a manner that the intermediate signal level is increased from approximately a straight line.

Also, the two color-difference signals (R–Y) and (B–Y) from the change-over switches 3R, 3B are supplied to a color gain control circuit 13 which is controlled by the output control signal Vc from the control circuit 11 which will be described later on. Here, the color gain control circuit 13 is arranged such that the gain of input and output characteristics is increased as the control signal (voltage) Vc, for example, is increased.

Further, the corrected luminance signal (Y) from the dynamic gamma circuit 5 and the two color-difference signals (R–Y), (B–Y) gain-controlled from the color gain control circuit 13 are all supplied to a converting circuit 6, in which they are converted into three primary color signals of red (R), green (G), blue (B), for example. Then, the three primary color signals (R/G/B) thus converted by this converting circuit 6 are respectively supplied to A/D converting circuits 7R, 7G, 7B from which the three primary color signals (R/G/B) thus digitally-converted are supplied to a display means 8 such as a plasma display or a liquid-crystal display.

On the other hand, the luminance signal (Y) from the change-over switch 3Y is supplied to a comparing circuit 9 to be compared with an arbitrary reference level and thereby converted into a square-wave signal which goes to "0" when it is higher than the reference level and which goes to "1" when it is lower than the reference level. This square-wave signal is integrated by an integrating circuit 10 and thereby generated as the signal indicative of the average luminance level of the above-mentioned luminance signal (Y). Incidentally, this integrating circuit 10 is of a 5V-system circuit, for example. Therefore, the signal thus generated is supplied to the control circuit 11 which effects the voltage-conversion from 5V to 12V, for example, in order to establish an electrical interface between the above-mentioned dynamic gamma circuit 5 and the color gain control circuit 13. Then, the output control signal Vc thus voltage-converted by this control circuit 11 is supplied to the dynamic gamma circuit 5 and the color gain control circuit 13.

As described above, according to this display device, the average luminance level of the luminance signal (Y) supplied from the separating circuit 2, for example, or the component input terminal 4 through the change-over switch 3Y is measured by the measuring means comprising the comparing circuit 9 to the control circuit 11. Further, the output control signal Vc, which corresponds to the average luminance level measured by this measuring means, from the control circuit 11 is supplied to the dynamic gamma circuit 5 and the color gain control circuit 13.

Then, the gamma correction curve of the above-mentioned dynamic gamma circuit 5 is feedforward-controlled in such a manner that the gamma correction between input and output becomes approximately a straight line when the average luminance level, for example, is large and that the intermediate signal level, for example, is increased when the average luminance level becomes small. Also, the color gain control circuit 13 is feedforward-controlled in such a manner that the color gain is increased when the average luminance level, for example, is large and that the color gain is decreased when the average luminance level becomes small.

Accordingly, since this display device includes the measuring means for measuring the average luminance level of the video signal to be displayed, the gamma correction means controlled by the output control signal from this measuring means and the color gain control circuit, the gamma correction curve and the color gain are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, the color gain may be controlled satisfactorily in response to the change of this luminance level.

Figure 9:
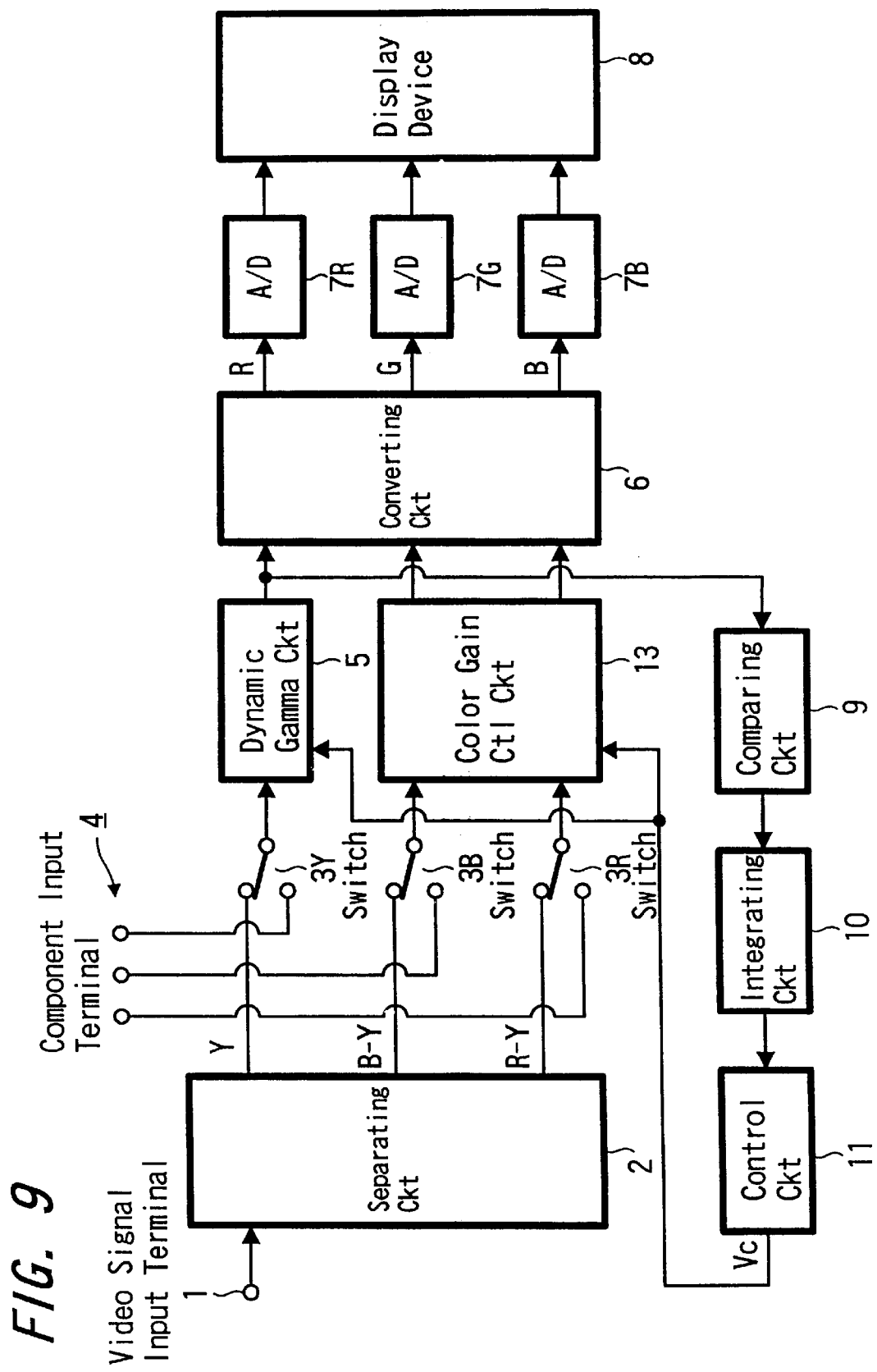
FIG. 9 is a block diagram showing a display device according to a sixth embodiment of the present invention.

Further, FIG. 9 is a block diagram showing a display device including a color gain control circuit according to a sixth embodiment of the present invention.

As shown in FIG. 9, the display device includes an input terminal 1 to which a composite video signal (video signal), for example, is supplied. The composite video signal from this input terminal 1 is supplied to a separating circuit 2 which separates the composite video signal, for example, to provide a luminance signal (Y) and two color-difference signals (R–Y), (B–Y). Further, the luminance signal (Y) and the two color-difference signals (R–Y), (B–Y) separated by this separating circuit 2 are respectively supplied to change-over switches 3Y, 3R, 3B, in which they are respectively switched from the signals from an input terminal (component input terminal) 4 to which the luminance signal (Y) and the two color-difference signals (R–Y), (B–Y) are supplied separately.

The luminance signal (Y) from this change-over switch 3Y is supplied to a gamma correction means (dynamic gamma circuit) 5 having a gamma correction curve controlled by an output control signal Vc from an output control circuit 11 which will be described later on. In the dynamic gamma circuit 5, a gamma correction characteristic curve between its input and output, for example, is controlled by the output control signal Vc from the control circuit 11, which will be described later on, in such a way as shown in FIG. 2, for example. That is, the gamma correction curve between input and output is controlled as shown by the arrow in FIG. 2 in response to the magnitude of the output control signal Vc in such a manner that the intermediate signal level is increased from approximately a straight line.

Also, the two color-difference signals (R–Y) and (B–Y) from the change-over switches 3R, 3B are supplied to a color gain control circuit 13 which is controlled by the output control signal Vc from the control circuit 11 which will be described later on. Here, the color gain control circuit 13 is arranged such that the gain of input and output characteristics is increased as the control signal (voltage) Vc, for example, is increased.

Further, the corrected luminance signal (Y) from the dynamic gamma circuit 5 and the two color-difference signals (R−Y), (B−Y) gain-controlled from the color gain control circuit 13 are each supplied to a converting circuit 6, in which they are converted into three primary color signals of red (R), green (G), blue (B), for example. Then, the three primary color signals (R/G/B) thus converted by this converting circuit 6 are respectively supplied to A/D converting circuits 7R, 7G, 7B from which the three primary color signals (R/G/B) thus digitally-converted are supplied to a display means 8 such as a plasma display or a liquid-crystal display.

Further, the luminance signal (Y) from the dynamic gamma circuit 5 is supplied to a comparing circuit 9 to be compared with an arbitrary reference level and thereby converted into a square-wave signal which goes to "0" when it is higher than the reference level and which goes to "1" when it is lower than the reference level. This square-wave signal is integrated by an integrating circuit 10 and thereby generated as the signal indicative of the average luminance level of the above-mentioned luminance signal (Y). Incidentally, this integrating circuit 10 is of a 5V-system circuit, for example. Therefore, the signal thus generated is supplied to the control circuit 11 which effects the voltage-conversion from 5V to 12V, for example, in order to establish an electrical interface between the above-mentioned dynamic gamma circuit 5 and the color gain control circuit 13. Then, the output control signal Vc thus voltage-converted by this control circuit 11 is supplied to the dynamic gamma circuit 5 and the color gain control circuit 13 mentioned above.

As described above, according to this display device, the average luminance level of the luminance signal (Y) outputted from the dynamic gamma circuit 5 is measured by the measuring means comprising the comparing circuit 9 to the control circuit 11. Further, the output control signal Vc, which corresponds to the average luminance level measured by this measuring means, from the control circuit 11 is supplied to the dynamic gamma circuit 5 and the color gain control circuit 13.

Then, the gamma correction curve of the above-mentioned dynamic gamma circuit 5 is feedback-controlled in such a manner that the gamma correction between input and output becomes approximately a straight line when the average luminance level, for example, is large and that the intermediate signal level, for example, is increased when the average luminance level becomes small. Also, the color gain control circuit 13 is feedback-controlled in such a manner that the color gain is increased when the average luminance level, for example, is large and that the color gain is decreased when the average luminance level becomes small.

Accordingly, since this display device includes the measuring means for measuring the average luminance level of the video signal to be displayed, the gamma correction means controlled by the output control signal from this measuring means and the color gain control circuit, the gamma correction curve and the color gain are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, the color gain may be controlled satisfactorily in response to the change of this luminance level.

Figure 10:
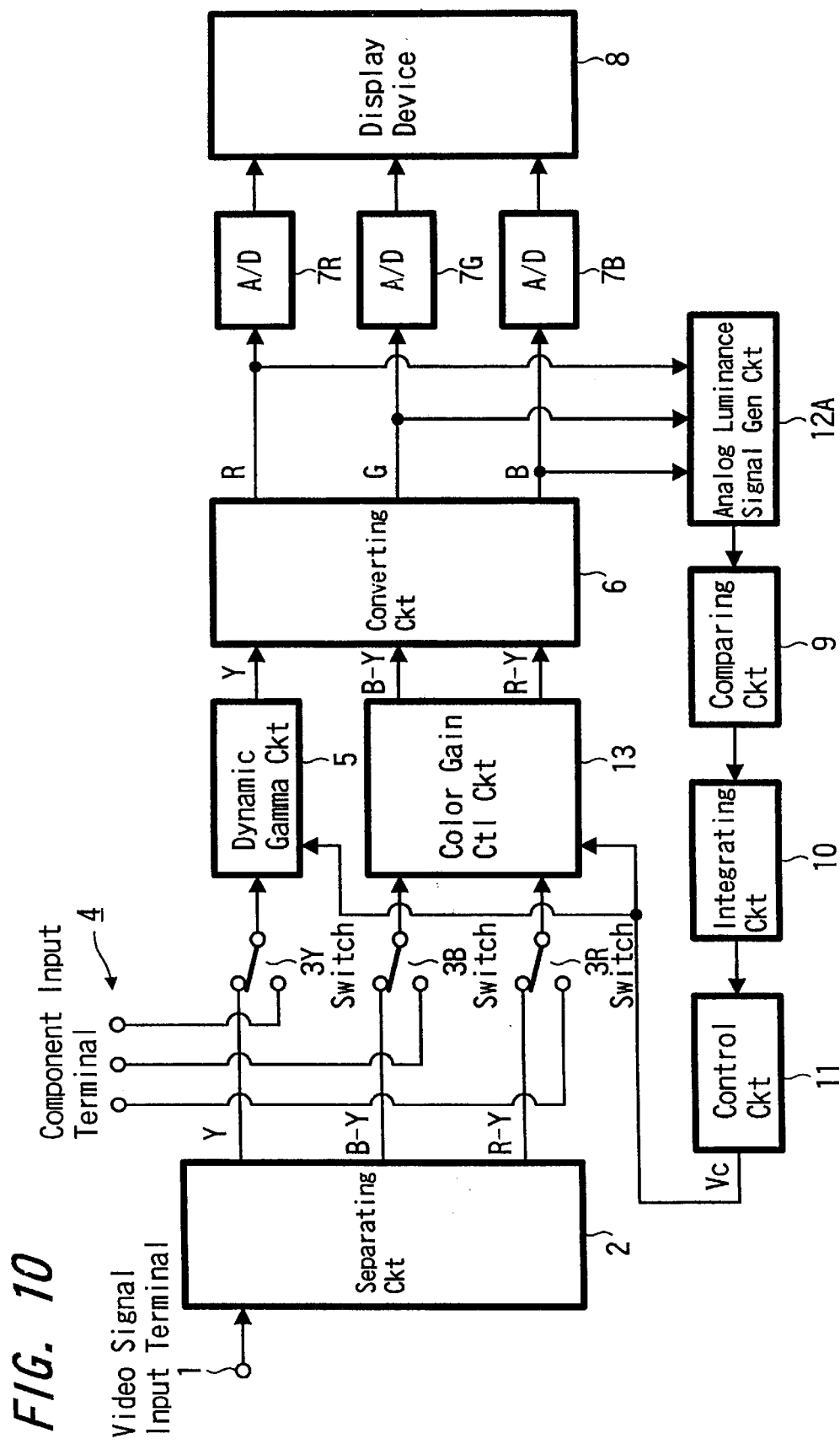
FIG. 10 is a block diagram showing a display device according to a seventh embodiment of the present invention.

Further, FIG. 10 is a block diagram showing a display device including a color gain control circuit according to a seventh embodiment of the present invention.

As shown in FIG. 10, the display device includes an input terminal 1 to which a composite video signal (video signal), for example, is supplied. The composite video signal from this input terminal 1 is supplied to a separating circuit 2 which separates the composite video signal, for example, to provide a luminance signal (Y) and two color-difference signals (R−Y), (B−Y). Further, the luminance signal (Y) and the two color-difference signals (R−Y), (B−Y) separated by this separating circuit 2 are respectively supplied to change-over switches 3Y, 3R, 3B, in which they are respectively switched from the signals from an input terminal (component input terminal) 4 to which the luminance signal (Y) and the two color-difference signals (R−Y), (B−Y) are supplied separately.

The luminance signal (Y) from this change-over switch 3Y is supplied to a gamma correction means (dynamic gamma circuit) 5 having a gamma correction curve controlled by an output control signal Vc from an output control circuit 11 which will be described later on. In the dynamic gamma circuit 5, a gamma correction characteristic curve between its input and output, for example, is controlled by the output control signal Vc from the control circuit 11, which will be described later on, in such a way as shown in FIG. 2, for example. That is, the input and output correction curve is controlled as shown by the arrow in FIG. 2 in response to the magnitude of the output control signal Vc in such a manner that the intermediate signal level is increased from approximately a straight line.

Also, the two color-difference signals (R−Y) and (B−Y) from the change-over switches 3R, 3B are supplied to a color gain control circuit 13 which is controlled by the output control signal Vc from the control circuit 11 which will be described later on. Here, the color gain control circuit 13 is arranged such that the gain of input and output characteristics is increased as the control signal (voltage) Vc, for example, is increased.

Further, the corrected luminance signal (Y) from the dynamic gamma circuit 5 and the two color-difference signals (R−Y), (B−Y) gain-controlled from the color gain control circuit 13 are each supplied to a converting circuit 6, in which they are converted into three primary color signals of red (R), green (G), blue (B), for example. Then, the three primary color signals (R/G/B) thus converted by this converting circuit 6 are respectively supplied to A/D converting circuits 7R, 7G, 7B from which the three primary color signals (R/G/B) thus digitally-converted are supplied to a display means 8 such as a plasma display or a liquid-crystal display.

Also, the three primary color signals (R/G/B) thus converted by the above-mentioned converting circuit 6 are supplied to an analog luminance signal generating circuit 12A. This luminance signal generating circuit 12A generates a luminance signal (Y) by adding the three primary color signals (R/G/B) with a predetermined ratio, e.g. at a ratio of Y=0.30R+0.59G+0.11B in the case of the NTSC system. The thus generated luminance signal (Y) is supplied to a comparing circuit 9, which compares a supplied luminance signal with an arbitrary reference level, and thereby converted into a square-wave signal which goes to "0" when it is higher than the reference level and which goes to "1" when it is lower than the reference level.

Further, an integrating circuit 10 integrates this square-wave signal to generate a signal indicative of the average luminance level of the above-mentioned luminance signal (Y). Incidentally, this integrating circuit 10 is of the 5V-system circuit, for example. Accordingly, the above-mentioned generated signal is supplied to the control circuit 11 which effects the voltage-conversion from 5V to 12V, for example, in order to establish the electrical interface between the above-mentioned dynamic gamma circuit 5 and the color gain control circuit 13. Then, the output control signal Vc thus voltage-converted by this control circuit 11 is supplied to the dynamic gamma circuit 5 and the color gain control circuit 13.

As described above, according to this display device, the luminance signal (Y) is generated from the three primary color signals (R/G/B) thus converted by the converting circuit 6. The average luminance level of the luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuit 5 and the color gain control circuit 13.

Then, the gamma correction curve of the above-mentioned dynamic gamma circuit 5 is feedback-controlled in such a manner that the gamma correction between input and output becomes approximately a straight line when the average luminance level, for example, is large and that the intermediate signal level, for example, is increased when the average luminance level becomes small. Also, the color gain control circuit 13 is feedback-controlled in such a manner that the color gain is increased when the average luminance level, for example, is large and that the color gain is decreased when the average luminance level becomes small.

Accordingly, since this display device includes the measuring means for measuring the average luminance level of the video signal to be displayed, the gamma correction means controlled by the output control signal from this measuring means and the color gain control circuit, the gamma correction curve and the color gain are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, the color gain may be controlled satisfactorily in response to the change of this luminance level.

Figure 11:
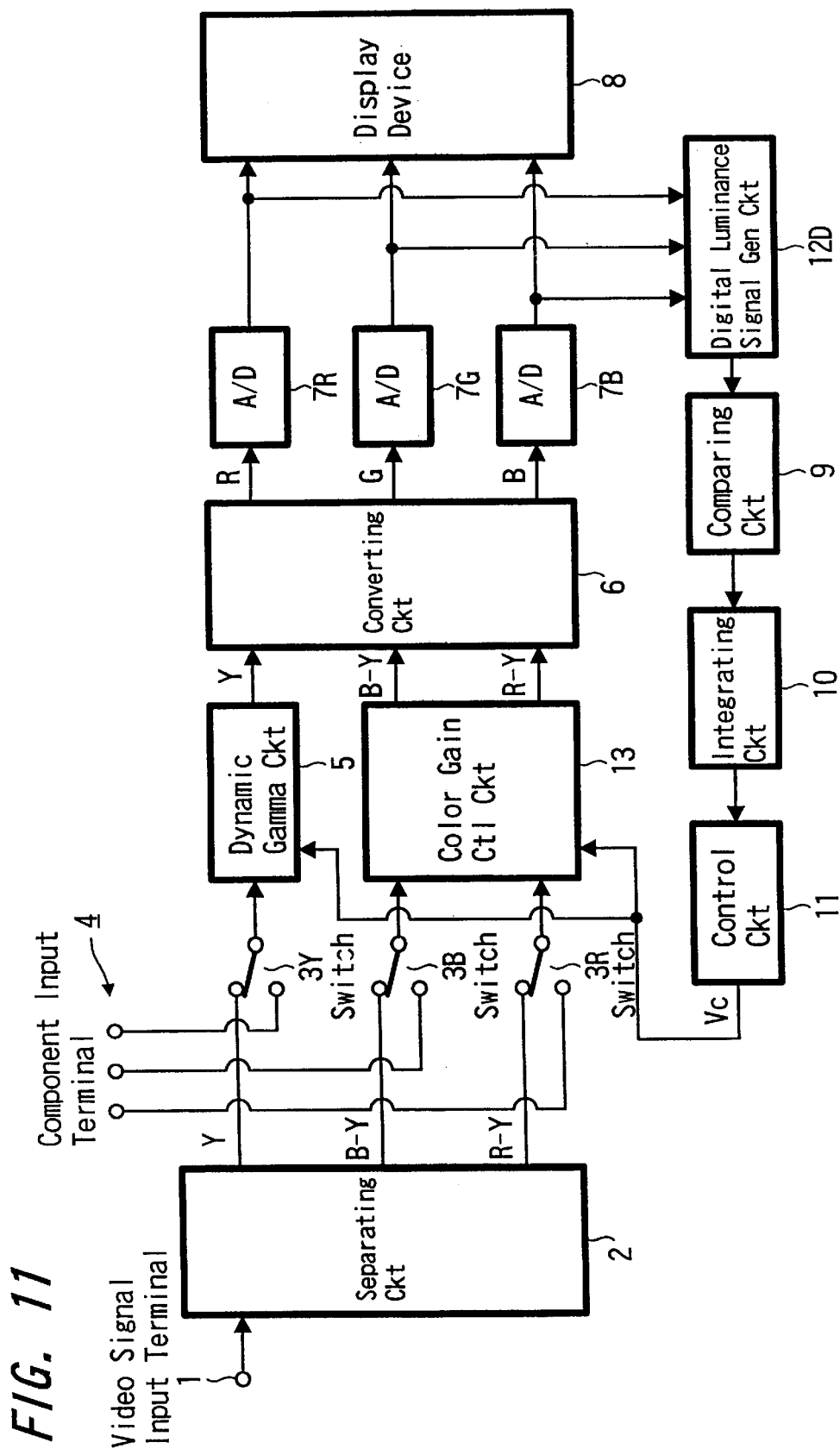
FIG. 11 is a block diagram showing a display device according to an eight embodiment of the present invention.

Further, FIG. 11 is a block diagram showing a display device including a color gain control circuit according to an eight embodiment of the present invention.

As shown in FIG. 11, the display device includes an input terminal 1 to which a composite video signal (video signal), for example, is supplied. The composite video signal from this input terminal 1 is supplied to a separating circuit 2 which separates the composite video signal, for example, to provide a luminance signal (Y) and two color-difference signals (R–Y), (B–Y). Further, the luminance signal (Y) and the two color-difference signals (R–Y), (B–Y) separated by this separating circuit 2 are respectively supplied to change-over switches 3Y, 3R, 3B, in which they are respectively switched from the signals from an input terminal (component input terminal) 4 to which the luminance signal (Y) and the two color-difference signals (R–Y), (B–Y) are supplied separately.

The luminance signal (Y) from this change-over switch 3Y is supplied to a gamma correction means (dynamic gamma circuit) 5 having a gamma correction curve controlled by an output control signal Vc from an output control circuit 11 which will be described later on. In the dynamic gamma circuit 5, a gamma correction characteristic curve between its input and output, for example, is controlled by the output control signal Vc from the control circuit 11, which will be described later on, in such a way as shown in FIG. 2, for example. That is, the gamma correction curve between input and output is controlled as shown by the arrow in FIG. 2 in response to the magnitude of the output control signal Vc in such a manner that the intermediate signal level is increased from approximately a straight line.

Also, the two color-difference signals (R–Y) and (B–Y) from the change-over switches 3R, 3B are supplied to a color gain control circuit 13 which is controlled by the output control signal Vc from the control circuit 11 which will be described later on. Here, the color gain control circuit 13 is arranged such that the gain of input and output characteristics is increased as the control signal (voltage) Vc, for example, is increased.

Further, the corrected luminance signal (Y) from the dynamic gamma circuit 5 and the two color-difference signals (R–Y), (B–Y) with the controlled gains from the color gain control circuit 13 are each supplied to a converting circuit 6, in which they are converted into three primary color signals of red (R), green (G), blue (B), for example. Then, the three primary color signals (R/G/B) thus converted by this converting circuit 6 are respectively supplied to A/D converting circuits 7R, 7G, 7B from which the three primary color signals (R/G/B) thus digitally-converted are supplied to a display means 8 such as a plasma display or a liquid-crystal display.

Also, the three primary color signals (R/G/B) thus digitally converted by the above-mentioned A/D converting circuits 7R, 7G, 7B are supplied to a digital luminance signal generating circuit 12D. The three primary color signals (R/G/B) outputted from the A/D converting circuits 7R, 7G, 7B are digital signals in which a sampling frequency, for example, is 30 MHz and the quantization bit number is 8 bits (quantization value ranges from 0 to 255). This luminance signal generating circuit 12D generates a luminance signal (Y: digital value) by adding the three primary color signals (R/G/B) with a predetermined ratio, e.g. at a ratio of Y=0.30R+0.59G+0.11B in the case of the NTSC system.

The thus generated luminance signal (Y: digital value) is supplied to a comparing circuit 9, which compares a supplied luminance signal with an arbitrary reference level, e.g. quantization value 100, and thereby converted into a square-wave signal which goes to "0" when it is higher than the reference level and which goes to "1" when it is lower than the reference level. An integrating circuit 10 integrates this square-wave signal to generate a signal (analog value) indicative of the average luminance level of the above-mentioned luminance signal (Y). Incidentally, this integrating circuit 10 is of the 5V-system circuit, for example. Accordingly, the above-mentioned generated signal is supplied to the control circuit 11 which effects the voltage-conversion from 5V to 12V, for example, in order to establish the electrical interface between the above-mentioned dynamic gamma circuit 5 and the color gain control circuit 13. Then, the output control signal Vc thus voltage-controlled by this control circuit 11 is supplied to the dynamic gamma circuit 5 and the color gain control circuit 13.

As described above, according to this display device, the luminance signal (Y: digital value) is generated from the three primary color signals (R/G/B) thus converted by the A/D converting circuits 7R, 7G, 7B, and the average luminance level (analog value) of this luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuit 5 and the color gain control circuit 13.

Then, the gamma correction curve of the above-mentioned dynamic gamma circuit 5 is feedback-controlled in such a manner that the gamma correction between input and output becomes approximately a straight line when the average luminance level, for example, is large and that the intermediate signal level, for example, is increased when the average luminance level becomes small. Also, the color gain control circuit 13 is feedback-controlled in such a manner that the color gain is increased when the average luminance level, for example, is large and that the color gain is decreased when the average luminance level becomes small.

Accordingly, since this display device includes the measuring means for measuring the average luminance level of the video signal to be displayed, the gamma correction means controlled by the output control signal from this measuring means and the color gain control circuit, the gamma correction curve and the color gain are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, the color gain may be controlled satisfactorily in response to the change of the luminance level.

In the above-mentioned apparatus, when a more accurate correction is required, it is considered that, for example, the three primary color signals of red (R), green (G), blue (B) may be corrected. In this case, the three primary color signals of red (R), green (G), blue (B), for example, may be gamma-corrected similarly to the above-mentioned luminance signal (Y).

Figure 12:
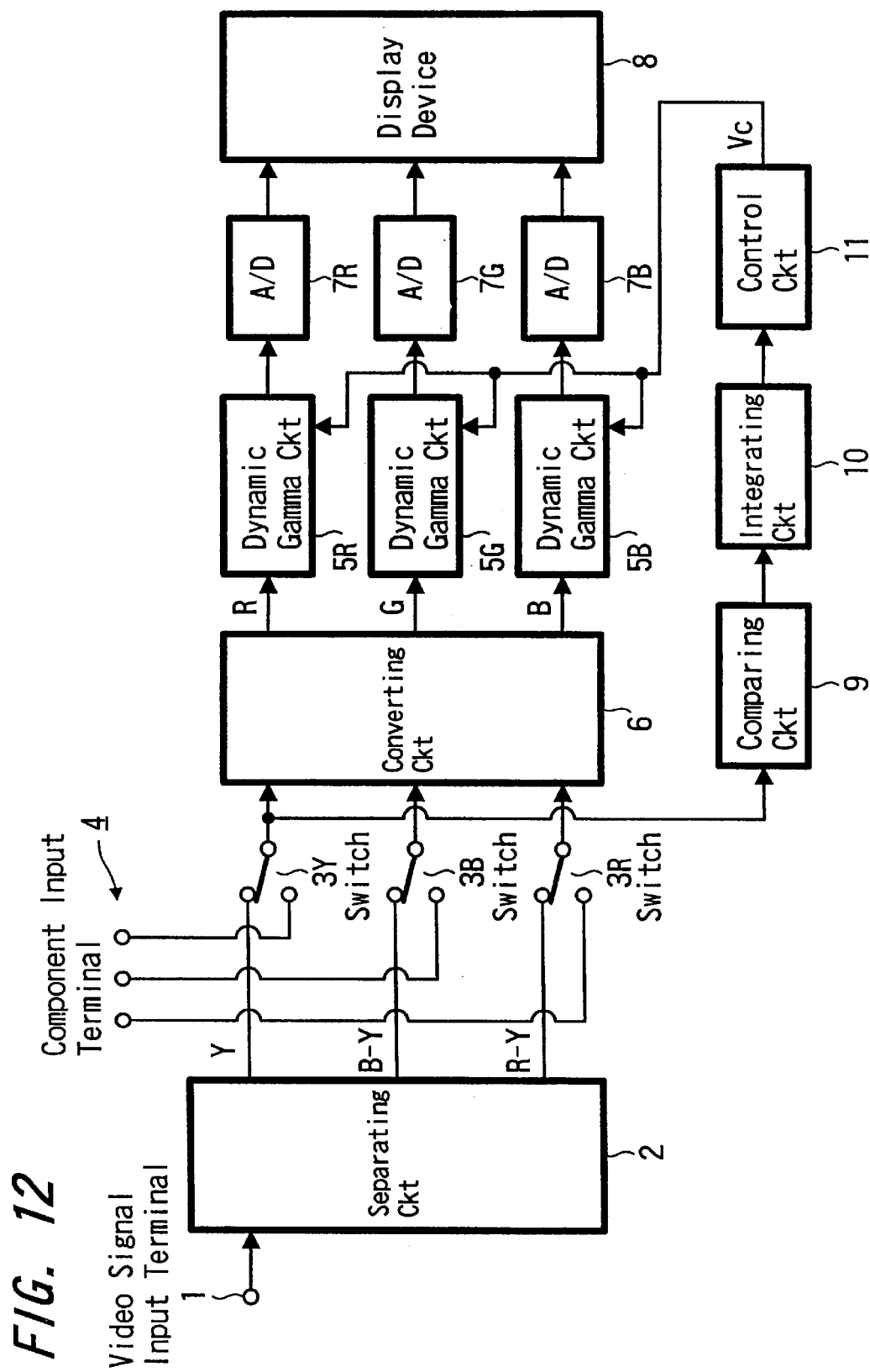
FIG. 12 is a block diagram showing a display device according to a ninth embodiment of the present invention.

Specifically, FIG. 12 is a block diagram showing a display device in which each of the three primary color signals of red (R), green (G), blue (B), for example, is gamma-corrected according to a ninth embodiment of the present invention.

As shown in FIG. 12, the display device includes an input terminal 1 to which there is supplied a composite video signal (video signal), for example. The composite video signal from this input terminal 1 is supplied to a separating circuit 2 which separates the composite video signal, for example, to provide a luminance signal (Y) and two color difference signals (R−Y), (B−Y). The luminance signal (Y) and the two color-difference signals (R−Y) and (B−Y) separated by the separating circuit 2 are respectively supplied to change-over switches 3Y, 3R, 3B, in which they are switched from signals supplied from an input terminal (component input terminal) 4 to which a luminance signal (Y) and two color-difference signals (R−Y), (B−Y), for example, are supplied, separately.

Further, the luminance signal (Y) and the two color-difference signals (R−Y), (B−Y) from the above-mentioned change-over switches 3R, 3B are each supplied to a converting circuit 6, in which they are converted into three primary color signals of red (R), green (G), blue (B), for example. The three primary color signals (R/G/B) thus converted by this converting circuit 6 are respectively supplied to gamma correction means (dynamic gamma circuits) 5R, 5G, 5B, each having a gamma correction curve controlled by an output control signal Vc from a control circuit 11 which will be described later on.

The dynamic gamma circuits 5R, 5G, 5B are controlled by the output control signal Vc from the control circuit 11, which will be described later on, in such a manner that an input and output gamma correction curve, for example, is presented as shown in FIG. 2, for example. Specifically, the dynamic gamma circuits 5R, 5G, 5B are controlled by the magnitude of the output control signal Vc in such a manner that the intermediate signal level of the gamma correction curve between input and output is increased from approximately a straight line as shown by an arrow in FIG. 2, for example. The three primary color signals (R/G/B) from the dynamic gamma circuits 5R, 5G, 5B are respectively supplied to A/D (analog-to-digital) converting circuits 7R, 7G, 7B. Further, resultant digital three primary color signals (R/G/B) are supplied from the A/D converting circuits 7R, 7G, 7B to a display device 8 such as a plasma display or a liquid-crystal display.

On the other hand, the luminance signal (Y) from the change-over switch 3Y is supplied to a comparing circuit 9 to be compared with an arbitrary reference level and thereby converted into a square-wave signal which goes to "0" when it is higher than the reference level and which goes to "1" when it is lower than the reference level. This square-wave signal is integrated by an integrating circuit 10 and thereby generated as the signal indicative of the average luminance level of the above-mentioned luminance signal (Y). Incidentally, this integrating circuit 10 is of a 5V-system circuit, for example. Therefore, the signal thus generated is supplied to the control circuit 11 which effects the voltage-conversion from 5V to 12V, for example, in order to establish an electrical interface between the integrating circuit 10 and the dynamic gamma circuits 5R, 5G, 5B. Then, the output control signal Vc thus voltage-converted by this control circuit 11 is supplied to the above-mentioned dynamic gamma circuits 5R, 5G, 5B.

In this manner, in this display device, the average luminance level of the luminance signal (Y) from the separating circuit 2 or the component input terminal 4 through the change-over switch 3Y is measured by the measuring means comprising the comparing circuit 9 to the control circuit 11. Further, the output control signal Vc corresponding to the average luminance level measured by this measuring means is supplied from the control circuit 11 to the dynamic gamma circuits 5R, 5G, 5B. Then, the gamma correction curves of the above-mentioned dynamic gamma circuits 5R, 5G, 5B are feedforward-controlled in such a fashion that the gamma correction between input and output becomes approximately a straight line when the average luminance level is large and that the intermediate signal level, for example, is increased when the average luminance level becomes small.

Accordingly, since this display device includes the measuring means for measuring the average luminance level of the video signal to be displayed and the gamma-correction means for three primary color signals controlled by the output control signal from this measuring means, the gamma correction curves of respective three primary color signals are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily and a more accurate correction may be carried out.

Figure 13:
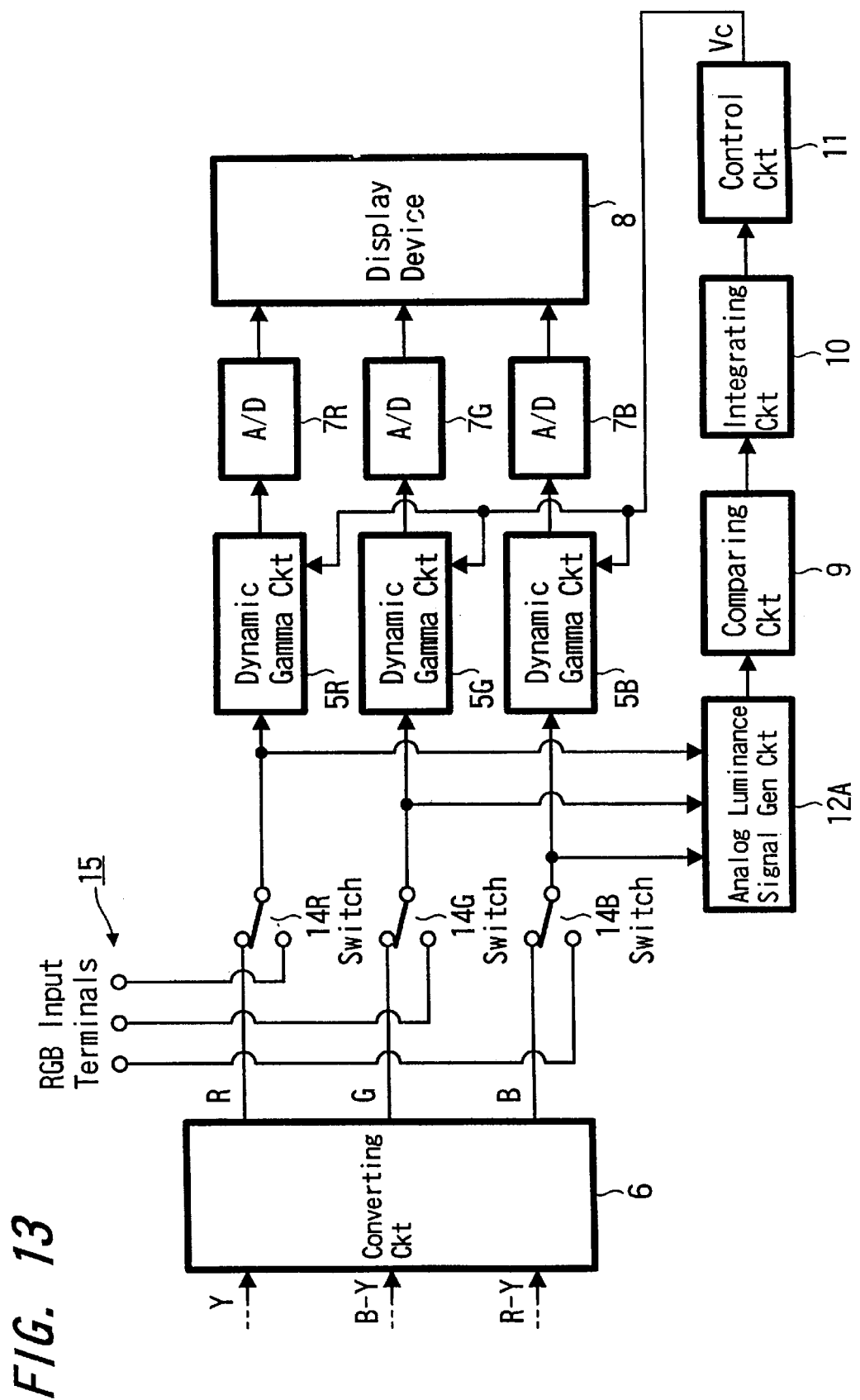
FIG. 13 is a block diagram showing a display device according to a tenth embodiment of the present invention.

Further, FIG. 13 is a block diagram showing a display device in which the three primary color signals of red (R), green (G), blue (B) are gamma-corrected according to a tenth embodiment of the present invention. In FIG. 13, the circuit arrangement provided ahead of the converting circuit 6 are omitted for convenience sake of sheets of drawings, and the arrangement of this portion is similar to that of FIG. 12.

Referring to FIG. 13, the luminance signal (Y) and the two color-difference signals (R−Y), (B−Y) from the above-mentioned change-over switches 3Y, 3R, 3B (not shown) are each supplied to a converting circuit 6. The three primary color signals of red (R), green (G), blue (B) thus converted by this converting circuit 6 are each supplied to change-over switches 14R, 14G, 14B, in which they are respectively switched from signals from an RGB input terminal 15 to which the three primary color signals (R/G/B), for example, are supplied independently.

Then, the three primary color signals (R/G/B) from the change-over switches 14R, 14G, 14B are respectively supplied to gamma correction means (dynamic gamma circuits) 5R, 5G, 5B, each having a gamma correction curve controlled by an output control signal Vc from a control circuit 11 which will be described later on. The dynamic gamma circuits 5R, 5G, 5B are each controlled by the output control signal Vc from the control circuit 11, which will be described later on, in such a manner that an input and output gamma correction curve, for example, is presented as shown in FIG. 2, for example. Specifically, the dynamic gamma circuits 5R, 5G, 5B are each controlled by the output control signal Vc in such a manner that the intermediate signal level of the gamma correction curve between input and output is increased from approximately a straight line as shown by an arrow in FIG. 2, for example.

Further, the corrected three primary color signals (R/G/B) from the dynamic gamma circuits 5R, 5G, 5B are respectively supplied to A/D (analog-to-digital) converting circuits 7R, 7G, 7B. Furthermore, resultant digital three primary color signals (R/G/B) are supplied from the A/D converting circuits 7R, 7G, 7B to a display device 8 such as a plasma display or a liquid-crystal display.

Also, the three primary color signals (R/G/B) from the above-mentioned change-over switches 14R, 14G, 14B are supplied to an analog luminance signal generating circuit 12A. This luminance signal generating circuit 12A generates a luminance signal (Y) by adding the three primary color signals (R/G/B) with a predetermined ratio, e.g. at a ratio of Y=0.30R+0.59G+0.11B in the case of the NTSC system. The thus generated luminance signal (Y) is supplied to a comparing circuit 9, which compares a supplied luminance signal with an arbitrary reference level, and thereby converted into a square-wave signal which goes to "0" when it is higher than the reference level and which goes to "1" when it is lower than the reference level.

Further, an integrating circuit 10 integrates this square-wave signal to generate a signal indicative of the average luminance level of the above-mentioned luminance signal (Y). Incidentally, this integrating circuit 10 is of the 5V-system circuit, for example. Accordingly, the above-mentioned generated signal is supplied to the control circuit 11 which effects the voltage-conversion from 5V to 12V, for example, in order to establish the electrical interface with the above-mentioned dynamic gamma circuits 5R, 5G, 5B. Then, the output control signal Vc thus voltage-controlled by this control circuit 11 is supplied to the dynamic gamma circuits 5R, 5G, 5B.

As described above, according to this display device, the luminance signal (Y) is generated from the three primary color signals (R/G/B) from the change-over switches 14R, 14G, 14B. The average luminance level of the luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuits 5R, 5G, 5B. Then, the gamma correction curves of the above-mentioned dynamic gamma circuits 5R, 5G, 5B are feedforward-controlled in such a manner that the gamma correction between input and output becomes approximately a straight line when the average luminance level, for example, is large and that the intermediate signal level, for example, is increased when the average luminance level becomes small.

Accordingly, since this display device includes the measuring means for measuring the average luminance level of the video signal to be displayed and the gamma correction means for three primary color signals controlled by the output control signal from this measuring means, the gamma correction curves for the three primary color signals are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily and may be corrected more accurately. At the same time, the display device according to this embodiment can cope with the RGB input terminal to which the three primary color signals are supplied independently.

Figure 14:
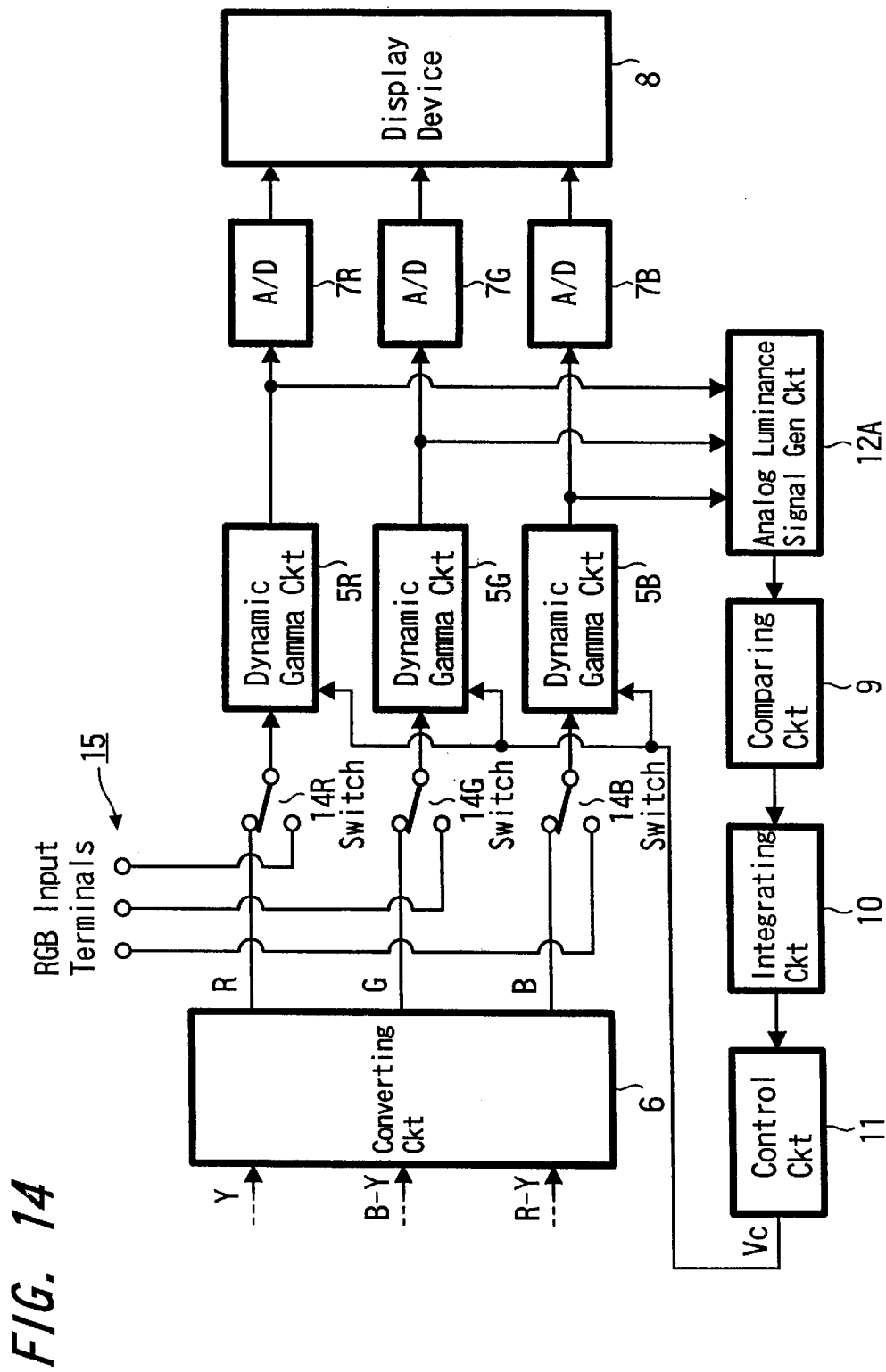
FIG. 14 is a block diagram showing a display device according to an eleventh embodiment of the present invention.

Further, FIG. 14 is a block diagram showing a display device in which the three primary color signals of red (R), green (G), blue (B) are gamma-corrected according to an eleventh embodiment of the present invention. In FIG. 14, the circuit arrangement provided ahead of the converting circuit 6 is omitted for convenience sake of sheets of drawings, and the arrangement of this portion is similar to that of FIG. 12.

Referring to FIG. 14, the luminance signal (Y) and the two color-difference signals (R−Y), (B−Y) from the above-mentioned change-over switches 3Y, 3R, 3B (not shown) are each supplied to a converting circuit 6. The three primary color signals of red (R), green (G), blue (B) thus converted by this converting circuit 6 are each supplied to change-over switches 14R, 14G, 14B, in which they are respectively switched from signals from an RGB input terminal 15 to which the three primary color signals (R/G/B), for example, are supplied independently.

Then, the three primary color signals (R/G/B) from the change-over switches 14R, 14G, 14B are respectively supplied to gamma correction means (dynamic gamma circuits) 5R, 5G, 5B, each having a gamma correction curve controlled by an output control signal Vc from a control circuit 11 which will be described later on. The dynamic gamma circuits 5R, 5G, 5B are controlled by the output control signal Vc from the control circuit 11, which will be described later on, in such a manner that an input and output gamma correction curve, for example, is presented as shown in FIG. 2, for example. Specifically, the dynamic gamma circuits 5R, 5G, 5B are controlled by the output control signal Vc in such a manner that the intermediate signal level of the gamma correction curve between input and output is increased from approximately a straight line as shown by an arrow in FIG. 2, for example.

Further, the corrected three primary color signals (R/G/B) from these dynamic gamma circuits 5R, 5G, 5B are respectively supplied to A/D (analog-to-digital) converting circuits 7R, 7G, 7B. Furthermore, resultant digital three primary color signals (R/G/B) are supplied from the A/D converting circuits 7R, 7G, 7B to a display device 8 such as a plasma display or a liquid-crystal display.

Also, the three primary color signals (R/G/B) from the above-mentioned dynamic gamma circuits 5R, 5G, 5B are supplied to an analog luminance signal generating circuit 12A. This luminance signal generating circuit 12A generates a luminance signal (Y) by adding the three primary color signals (R/G/B) with a predetermined ratio, e.g. at a ratio of Y=0.30R+0.59G+0.11B in the case of the NTSC system, for example. The thus generated luminance signal (Y) is supplied to a comparing circuit 9, which compares a supplied luminance signal with an arbitrary reference level, and thereby converted into a square-wave signal which goes to "0" when it is higher than the reference level and which goes to "1" when it is lower than the reference level.

Further, an integrating circuit 10 integrates this square-wave signal to generate a signal indicative of the average luminance level of the above-mentioned luminance signal (Y). Incidentally, this integrating circuit 10 is of the 5V-system circuit, for example. Accordingly, the above-mentioned generated signal is supplied to the control circuit 11 which effects the voltage-conversion from 5V to 12V, for example, in order to establish the electrical interface with the above-mentioned dynamic gamma circuits 5R, 5G, 5B. Then, the output control signal Vc thus voltage-controlled by this control circuit 11 is supplied to the dynamic gamma circuits 5R, 5G, 5B.

As described above, according to this display device, the luminance signal (Y) is generated from the corrected three primary color signals (R/G/B) from the dynamic gamma circuits 5R, 5G, 5B. The average luminance level of the luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuits 5R, 5G, 5B. Then, the gamma correction curves of the above-mentioned dynamic gamma circuits 5R, 5G, 5B are feedback-controlled in such a manner that the gamma correction between input and output becomes approximately a straight line when the average luminance level, for example, is large and that the intermediate signal level, for example, is increased when the average luminance level becomes small.

Accordingly, since this display device includes the measuring means for measuring the average luminance level of the video signal to be displayed and the gamma correction means for three primary color signals controlled by the output control signal from this measuring means, the gamma correction curves for the three primary color signals are controlled-in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily and may be corrected more accurately. At the same time, the display device according to this embodiment can cope with the RGB input terminal to which the three primary color signals are supplied independently.

Figure 15:
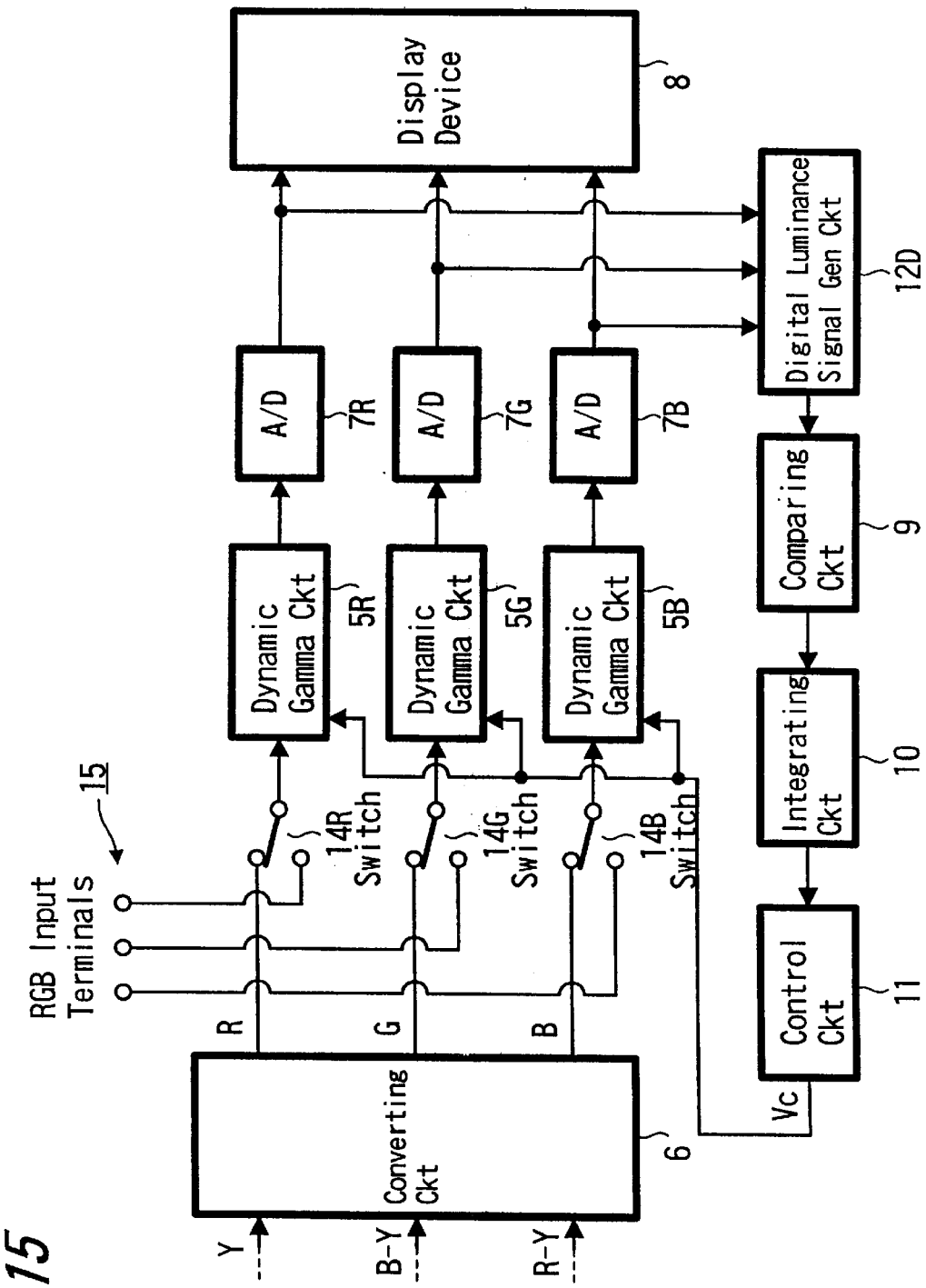
FIG. 15 is a block diagram showing a display device according to a twelfth embodiment of the present invention.

Further, FIG. 15 is a block diagram showing a display device in which the three primary color signals of red (R), green (G), blue (B) are gamma-corrected according to a twelfth embodiment of the present invention. Incidentally, also in FIG. 15, the circuit arrangement provided ahead of the converting circuit 6 is omitted for convenience sake of sheets of drawings, and the arrangement of this portion is similar to that of FIG. 12.

Referring to FIG. 15, the luminance signal (Y) and the two color-difference signals (R−Y), (B−Y) from the above-mentioned change-over switches 3Y, 3R, 3B (not shown) are each supplied to a converting circuit 6. Further, the three primary color signals of red (R), green (G), blue (B) thus converted by this converting circuit 6 are respectively supplied to change-over switches 14R, 14G, 14B, in which they are respectively switched from signals from an RGB input terminal 15 to which the three primary color signals (R/G/B), for example, are supplied independently.

Then, the three primary color signals (R/G/B) from the change-over switches 14R, 14G, 14B are respectively supplied to gamma correction means (dynamic gamma circuits) 5R, 5G, 5B, each having a gamma correction curve controlled by an output control signal Vc from a control circuit 11 which will be described later on. The dynamic gamma circuits 5R, 5G, 5B are controlled by the output control signal Vc from the control circuit 11, which will be described later on, in such a manner that an input and output gamma correction curve, for example, is presented as shown in FIG. 2, for example. Specifically, the dynamic gamma circuits 5R, 5G, 5B are controlled in response to the magnitude of the output control signal Vc in such a manner that the intermediate signal level of the gamma correction curve between input and output is increased from approximately a straight line as shown by an arrow in FIG. 2, for example.

Further, the corrected three primary color signals (R/G/B) from these dynamic gamma circuits 5R, 5G, 5B are respectively supplied to A/D (analog-to-digital) converting circuits 7R, 7G, 7B. Furthermore, resultant digital three primary color signals (R/G/B) are supplied from the A/D converting circuits 7R, 7G, 7B to a display device 8 such as a plasma display or a liquid-crystal display.

Also, the three primary color signals (R/G/B) thus digitally converted by the above-mentioned A/D converting circuits 7R, 7G, 7B are supplied to a digital luminance signal generating circuit 12D. The three primary color signals (R/G/B) outputted from the A/D converting circuits 7R, 7G, 7B are digital signals in which a sampling frequency, for example, is 30 MHz and the quantization bit number is 8 bits (quantization value ranges from 0 to 255). This luminance signal generating circuit 12D generates a luminance signal (Y: digital value) by adding the three primary color signals (R/G/B) with a predetermined ratio, e.g. at a ratio of Y=0.30R+0.59G+0.11B in the case of the NTSC system.

The thus generated luminance signal (Y: digital value) is supplied to a comparing circuit 9, which compares a supplied luminance signal with an arbitrary reference level, e.g. quantization value 100, and thereby converted into a square-wave signal which goes to "0" when it is higher than the reference level and which goes to "1" when it is lower than the reference level. An integrating circuit 10 integrates this square-wave signal to generate a signal (analog value) indicative of the average luminance level of the above-mentioned luminance signal (Y). Incidentally, this integrating circuit 10 is of the 5V-system circuit, for example. Accordingly, the above-mentioned generated signal is supplied to the control circuit 11 which effects the voltage-conversion from 5V to 12V, for example, in order to establish the electrical interface between the above-mentioned dynamic gamma circuits 5R, 5G, 5B and the integrating circuit 10. Then, the output control signal Vc thus voltage-controlled by this control circuit 11 is supplied to the dynamic gamma circuits 5R, 5G, 5B.

As described above, according to this display device, the luminance signal (Y: digital value) is generated from the three primary color signals (R/G/B) thus digitally converted by the A/D converting circuits 7R, 7G, 7B, and the average luminance level (analog value) of this luminance signal (Y) is measured by the measuring means comprising the comparing circuit 9 to the control circuit 11. Further, the output control signal Vc, which corresponds to the average luminance level measured by this measuring means, from the control circuit 11 is supplied to the dynamic gamma circuits 5R, 5G, 5B. Then, the gamma correction curves of the above-mentioned dynamic gamma circuits 5R, 5G, 5B are feedback-controlled in such a manner that the gamma correction between input and output becomes approximately a straight line when the average luminance level, for example, is large and that the intermediate signal level, for example, is increased when the average luminance level becomes small.

Accordingly, since this display device includes the measuring means for measuring the average luminance level of the video signal to be displayed and the gamma correction means for three primary color signals controlled by the output control signal from this measuring means, the gamma correction curves for the three primary color signals are controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily and may be corrected more accurately. At the same time, the display device according to this embodiment can cope with the RGB input terminal to which the three primary color signals are supplied independently.

Furthermore, in the above-mentioned apparatus, when more complex corrections matched with characteristics of the respective signals or the like are required, it is considered that the digitally-converted three primary color signals of red (R), green (G), blue (B), for example, may be corrected. In this case, when the three primary color signals of red (R), green (G), blue (B), for example, are gamma-corrected, these three primary color signals of red (R), green (G), blue (B) can be gamma-corrected similarly to the above-mentioned luminance signal (Y). Also, as a signal correction means, it is possible to use a read-only memory (ROM) and a so-called digital signal processor (DSP).

Figure 16:
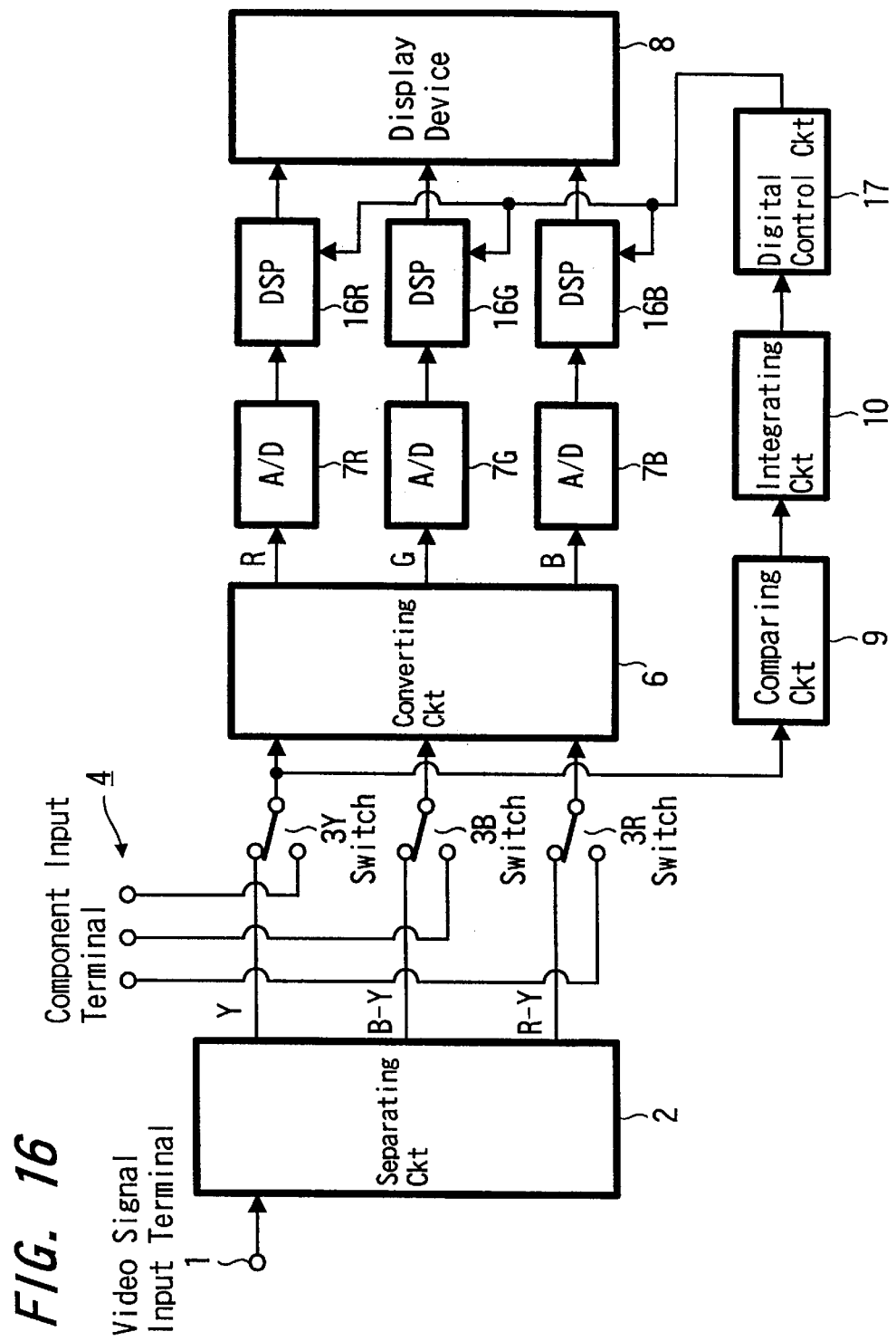
FIG. 16 is a block diagram showing a display device according to a thirteenth embodiment of the present invention.

Specifically, FIG. 16 is a block diagram showing a display device in which the digitally-converted three primary color signals of red (R), green (G), blue (B), for example, are respectively gamma-corrected according to a thirteenth embodiment of the present invention.

Referring to FIG. 16, the display device includes an input terminal 1 to which there is supplied a composite video signal (video signal), for example. The composite video signal from this input terminal 1 is supplied to a separating circuit 2 which separates the composite video signal, for example, to provide a luminance signal (Y) and two color-difference signals (R–Y), (B–Y). Further, the luminance signal (Y) and the two color-difference signals (R–Y) and (B–Y) separated by the separating circuit 2 are respectively supplied to change-over-switches 3Y, 3R, 3B, in which they are switched from signals supplied from an input terminal (component input terminal) 4 to which a luminance signal (Y) and two color-difference signals (R–Y), (B–Y), for example, are supplied, separately.

Further, the luminance signal (Y) and the two color-difference signals (R–Y), (B–Y) from the above-mentioned change-over switches 3Y, 3R, 3B are each supplied to a converting circuit 6, in which they are converted into three primary color signals of red (R), green (G), blue (B), for example. The three primary color signals (R/G/B) thus converted by this converting circuit 6 are respectively supplied to A/D (analog-to-digital) converting circuits 7R, 7G, 7B. Resultant digitally-converted three primary color signals (R/G/B) are respectively supplied to correction means (digital signal processors=DSP) 16R, 16G, 16B having gamma correction curves or the like controlled by an output control digital signal from a digital control circuit 17 which will be described later on.

Here, the digital signal processors (DSP) 16R, 16G, 16B are controlled by the output control digital signal from the digital control circuit 17, which will be described later on, in such a manner that gamma correction characteristic curves between input and output are controlled as shown in FIG. 2, for example. Specifically, the digital signal processors 16R, 16G, 16B are controlled by the output control digital signal such a manner that the intermediate signal level of the gamma correction curve between input and output is increased from approximately a straight line as shown by an arrow in FIG. 2, for example. The three primary color signals (R/G/B) from these digital signal processors (DSP) 16R, 16G, 16B are supplied to a display device 8 such as a plasma display or a liquid-crystal display.

On the other hand, the luminance signal (Y) from the change-over switch 3Y is supplied to a comparing circuit 9, which compares a supplied signal with an arbitrary reference level, and thereby converted into a square-wave signal which goes to "0" when it is higher than the reference level and which goes to "1" when it is lower than the reference level. This square-wave signal is integrated by an integrating circuit 10 and thereby generated as a signal indicative of an average luminance level of the above-mentioned luminance signal (Y). Then, the signal indicative of the average luminance level from this integrating circuit 10 is supplied to the digital control circuit 17 which then generates the output control digital signal to control the above-mentioned digital signal processors (DSP) 16R, 16G, 16B. Further, the output control digital signal generated by this digital control circuit 17 is supplied to the digital signal processors (DSP) 16R, 16G, 16B.

As described above, according to this display device, the average luminance level of the luminance signal (Y) supplied from the separating circuit 2, for example, or the component input terminal 4 through the change-over switch 3Y is measured by the measuring means comprising the comparing circuit 9 and the integrating circuit 10. Further, the output control digital signal corresponding to the average luminance level measured by this measuring means is generated by the digital control circuit 17 and then supplied to the digital signal processors (DSP) 16R, 16G, 16B. Then, the gamma correction curves and the like of the above-mentioned digital signal processors (DSP) 16R, 16G, 16B are feedforward-controlled in such a manner that the gamma correction between input and output becomes approximately a straight line when the average luminance level, for example, is large and that the intermediate signal level is increased when the average luminance level becomes small.

Accordingly, since this display device includes the measuring means for measuring the average luminance level of the video signal to be displayed and the gamma correction means for each of three primary color signals controlled by the output control signal from this measuring means, the gamma correction curve for each of the three primary color signals is controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, since the digital processing is used, a more complex correction matched with the characteristics of the respective signals may be carried out. At the same time, the display device according to this embodiment can cope with the RGB input terminal to which the three primary color signals are supplied independently.

Figure 17:
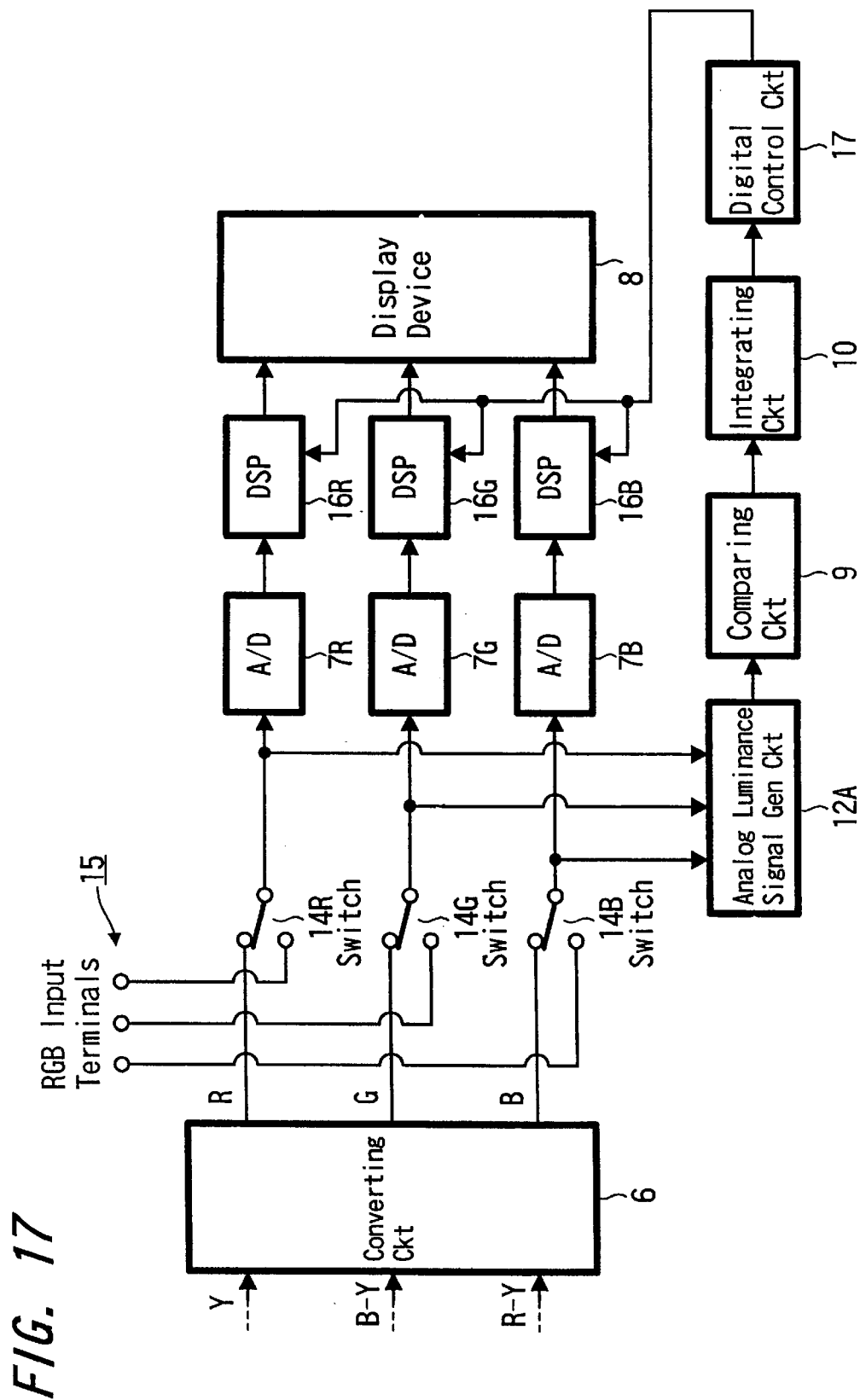
FIG. 17 is a block diagram showing a display device according to a fourteenth embodiment of the present invention.

Further, FIG. 17 is a block diagram showing a display device in which the digitally-converted three primary color signals of red (R), green (G), blue (B), for example, are respectively gamma-corrected according to a fourteenth embodiment of the present invention. Incidentally, in FIG. 17, the circuit arrangement provided ahead of the converting circuit 6 is omitted for convenience sake of sheets of drawings, and the arrangement of this portion is similar to that of FIG. 16.

Referring to FIG. 17, the luminance signal (Y) and the two color-difference signals (R−Y), (B−Y) from the above-mentioned change-over switches 3Y, 3R, 3b (not shown) are each supplied to a converting circuit 6. Further, the three primary color signal of red (R), green (G), blue (B), for example, thus converted by this converting circuit 6 are each supplied to change-over switches 14R, 14G, 14B, in which they are switched from signals from an RGB input terminal 15 to which three primary color signals (R/G/B), for example, are supplied independently.

The three primary color signals (R/G/B) from the change-over switches 14R, 14G, 14B are respectively supplied to A/D converting circuits 7R, 7G, 7B. Further, the thus digitally-converted three primary color signals (R/G/B) are respectively supplied to correction means (digital signal processors=DSP) 16R, 16G, 16B having gamma correction curves or the like controlled by an output control digital signal from a digital control circuit 17 which will be described later on.

Here, the digital signal processors (DSP) 16R, 16G, 16B are controlled by the output control digital signal from the digital control circuit 17, which will be described later on, in such a manner that gamma correction characteristic curves between input and output thereof are controlled as shown in FIG. 2, for example. Specifically, the digital signal processors 16R, 16G, 16B are controlled by the magnitude of the output control digital signal in such a manner that the intermediate signal level of the gamma correction curve between input and output is increased from approximately a straight line as shown by an arrow in FIG. 2, for example. The three primary color signals (R/G/B) from these digital signal processors (DSP) 16R, 16G, 16B are supplied to a display device 8 such as a plasma display or a liquid-crystal display.

Also, the three primary color signals (R/G/B) from the above-mentioned change-over switches 14R, 14G, 14B are supplied to an analog luminance signal generating circuit 12A. This luminance signal generating circuit 12A generates a luminance signal (Y) by adding the three primary color signals (R/G/B) with a predetermined ratio, e.g. with a ratio of Y=0.30R+0.59G+0.11B in the case of the NTSC system. The thus generated luminance signal (Y) is supplied to a comparing circuit 9, which compares a supplied luminance signal with an arbitrary reference level, and thereby converted into a square-wave signal which goes to "0" when it is higher than the reference level and which goes to "1" when it is lower than the reference level.

Further, an integrating circuit 10 integrates this square-wave signal to generate a signal indicative of the average luminance level of the above-mentioned luminance signal (Y). Then, the signal indicative of the average luminance level from this integrating circuit 10 is supplied to the digital control circuit 17 which then generates the output control digital signal to control the above-mentioned digital signal processors (DSP) 16R, 16G, 16B. Further, the output control digital signal generated at this digital control circuit 17 is supplied to the digital signal processors (DSP) 16R, 16G, 16B.

As described above, according to this display device, the luminance signal (Y) is generated from the three primary color signals (R/G/B) from the change-over switches 14R, 14G, 14B. The average luminance level of the luminance signal (Y) is measured by the measuring means comprising the comparing circuit 9 and the integrating circuit 10. Further, the output control digital signal corresponding to the average luminance level measured by this measuring means is generated by the digital control circuit 17 and then supplied to the digital signal processors (DSP) 16R, 16G, 16B. Then, the gamma correction curves and the like of the above-mentioned digital signal processors (DSP) 16R, 16G, 16B are feedforward-controlled in such a manner that the gamma correction between input and output becomes approximately a straight line when the average luminance level, for example, is large and that the intermediate signal level is increased when the average luminance level becomes small.

Accordingly, since this display device includes the measuring means for measuring the average luminance level of the video signal to be displayed and the gamma correction means for each of three primary color signals controlled by the output control signal from this measuring means, the gamma correction curve for each of the three primary color signals is controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Since the digital processing is used, a more complex correction matched with the characteristics of the respective signals or the like may be carried out. At the same time, the display device according to this embodiment can cope with the RGB input terminal to which the three primary color signals are supplied independently.

Figure 18:
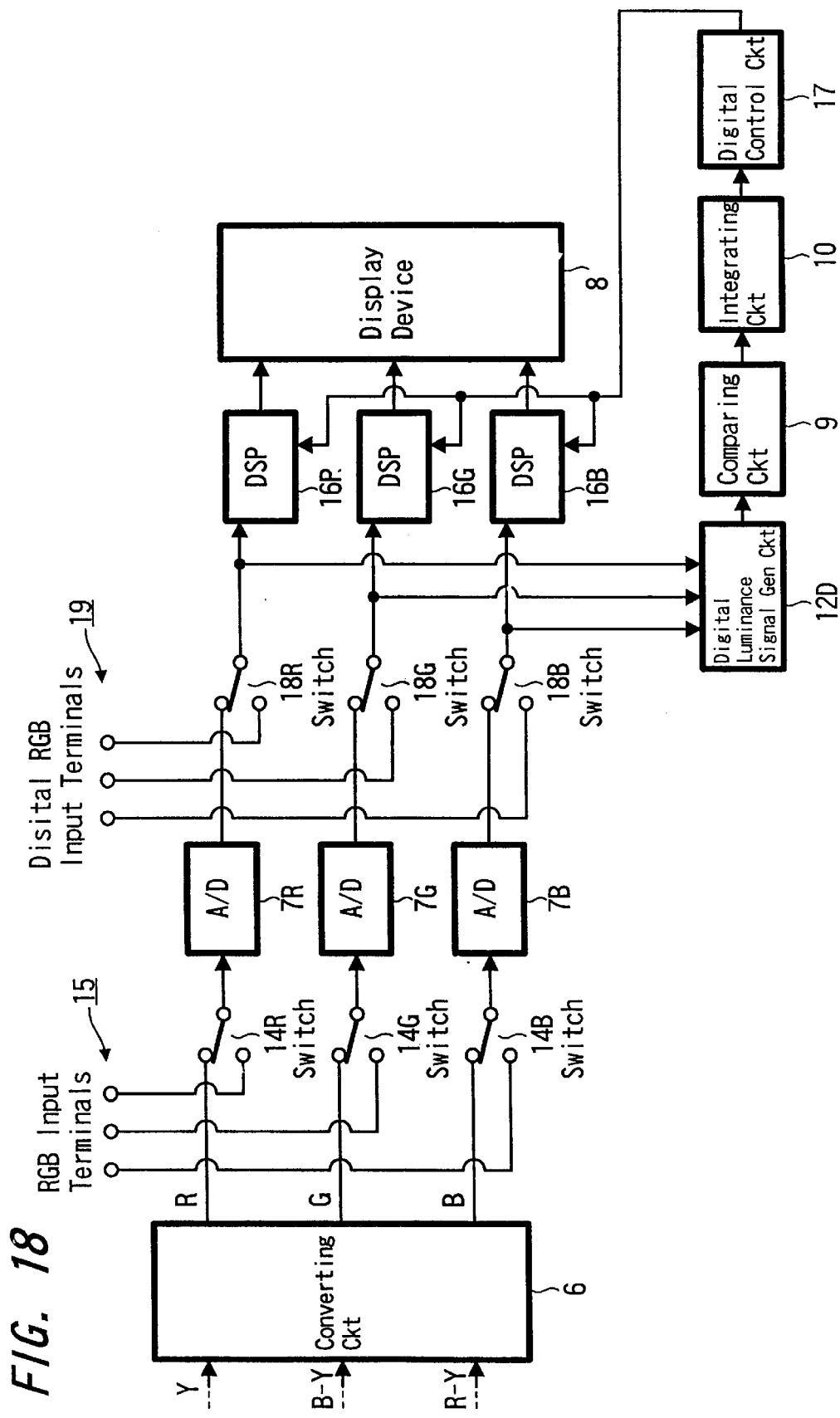
FIG. 18 is a block diagram showing a display device according to a fifteenth embodiment of the present invention.

Also, FIG. 18 is a block diagram showing a display device in which the digitally-converted three primary color signals of red (R), green (G), blue (B), for example, are respectively gamma-corrected according to a fifteenth embodiment of the present invention. Incidentally, in FIG. 18, the circuit arrangement provided ahead of the converting circuit 6 is omitted for convenience sake of sheets of drawings, and the arrangement of this portion is similar to that of FIG. 16.

Referring to FIG. 18, the luminance signal (Y) and the two color-difference signals (R−Y), (B−Y) from the above-mentioned change-over switches 3Y, 3R, 3B (not shown) are each supplied to a converting circuit 6. Further, the three primary color signal of red (R), green (G), blue (B), for example, thus converted by this converting circuit 6 are respectively supplied to change-over switches 14R, 14G, 14B, in which they are switched from signals from an RGB input terminal 15 to which three primary color signals (R/G/B), for example, are supplied independently.

The three primary color signals (R/G/B) from the change-over switches 14R, 14G, 14B are respectively supplied to A/D converting circuits 7R, 7G, 7B. Further, the thus digitally-converted three primary color signals (R/G/B) in the A/D converting circuits 7R, 7G, 7B are respectively supplied to change-over switches 18R, 18G, 18B, in which they are switched from signals from RGB digital input terminals 19 to which the digitally-converted three primary color signals (R/G/B) are supplied independently. Also, the digital three primary color signals (R/G/B) from the change-over switches 18R, 18G, 18B are respectively supplied to correction means (digital signal processors=DSP) 16R, 16G, 16B having gamma correction curves or the like controlled by an output control digital signal from a digital control circuit 17 which will be described later on.

Here, the digital signal processors (DSP) 16R, 16G, 16B are controlled by the output control digital signal from the digital control circuit 17, which will be described later on, in such a manner that gamma correction characteristic curves between input and output thereof are controlled as shown in FIG. 2, for example. Specifically, the digital signal processors 16R, 16G, 16B are controlled in such a manner that the intermediate signal level of the gamma correction curve between input and output is increased from approximately a straight line in response to the magnitude of the output control digital signal as shown by an arrow in FIG. 2, for example. The three primary color signals (R/G/B) from these digital signal processors (DSP) 16R, 16G, 16B are supplied to a display device 8 such as a plasma display or a liquid-crystal display.

Also, the digital three primary color signals (R/G/B) from the above-mentioned change-over switches 18R, 18G, 18B are supplied to a digital luminance signal generating circuit 12D. Here, the digital three primary color signals (R/G/B) derived from the change-over switches 18R, 18G, 18B are digital signals in which a sampling frequency, for example, is 30 MHz and a quantization bit number is 8 bits (quantization value ranges from 0 to 255). Accordingly, the above-mentioned luminance signal generating circuit 12D generates a luminance signal (Y: digital value) by adding the three primary color signals (R/G/B) of the digital values with a predetermined ratio, e.g. with a ratio of Y=0.30R+0.59G+0.11B in the case of the NTSC system.

Further, the thus generated luminance signal (Y: digital value) is supplied to a comparing circuit 9, which compares a supplied luminance signal with an arbitrary reference level, e.g. quantization value 100, and thereby converted into a square-wave signal which goes to "0" when it is higher than the reference level and which goes to "1" when it is lower than the reference level. Then, an integrating circuit 10 integrates this square-wave signal to generate a signal indicative of the average luminance level of the above-mentioned luminance signal (Y). Then, the signal indicative of the average luminance level from this integrating circuit 10 is supplied to the digital control circuit 17 which then generates the output control digital-signal to control the above-mentioned digital signal processors (DSP) 16R, 16G, 16B. Further, the output control digital signal generated at this digital control circuit 17 is supplied to the digital signal processors (DSP) 16R, 16G, 16B.

As described above, according to this display device, the luminance signal (Y: digital value) is generated from the digital three primary color signals (R/G/B) supplied from the A/D converting circuits 7R, 7G, 7B or the RGB input terminals 19 through the change-over switches 18R, 18G, 18B. The average luminance level of this luminance signal (Y) is measured by the measuring means comprising the comparing circuit 9 and the integrating circuit 10. Further, the output control digital signal corresponding to the average luminance level measured by this measuring means is generated by the digital control circuit 17 and then supplied to the digital signal processors (DSP) 16R, 16G, 16B. Then, the gamma correction curves and the like of the above-mentioned digital signal processors (DSP) 16R, 16G, 16B are feedforward-controlled in such a manner that the gamma correction between input and output becomes approximately a straight line when the average luminance level, for example, is large and that the intermediate signal level is increased, for example, when the average luminance level becomes small.

Accordingly, since this display device includes the measuring means for measuring the average luminance level of the video signal to be displayed and the gamma correction means for each of three primary color signals controlled by the output control signal from this measuring means, the gamma correction curves for the three primary color signals are respectively controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Since the digital processing is used, a more complex correction matched with the characteristics of the respective signals or the like may be carried out. At the same time, the display device according to this embodiment can cope with the RGB input terminals to which the three primary color signals are supplied independently.

Figure 19:
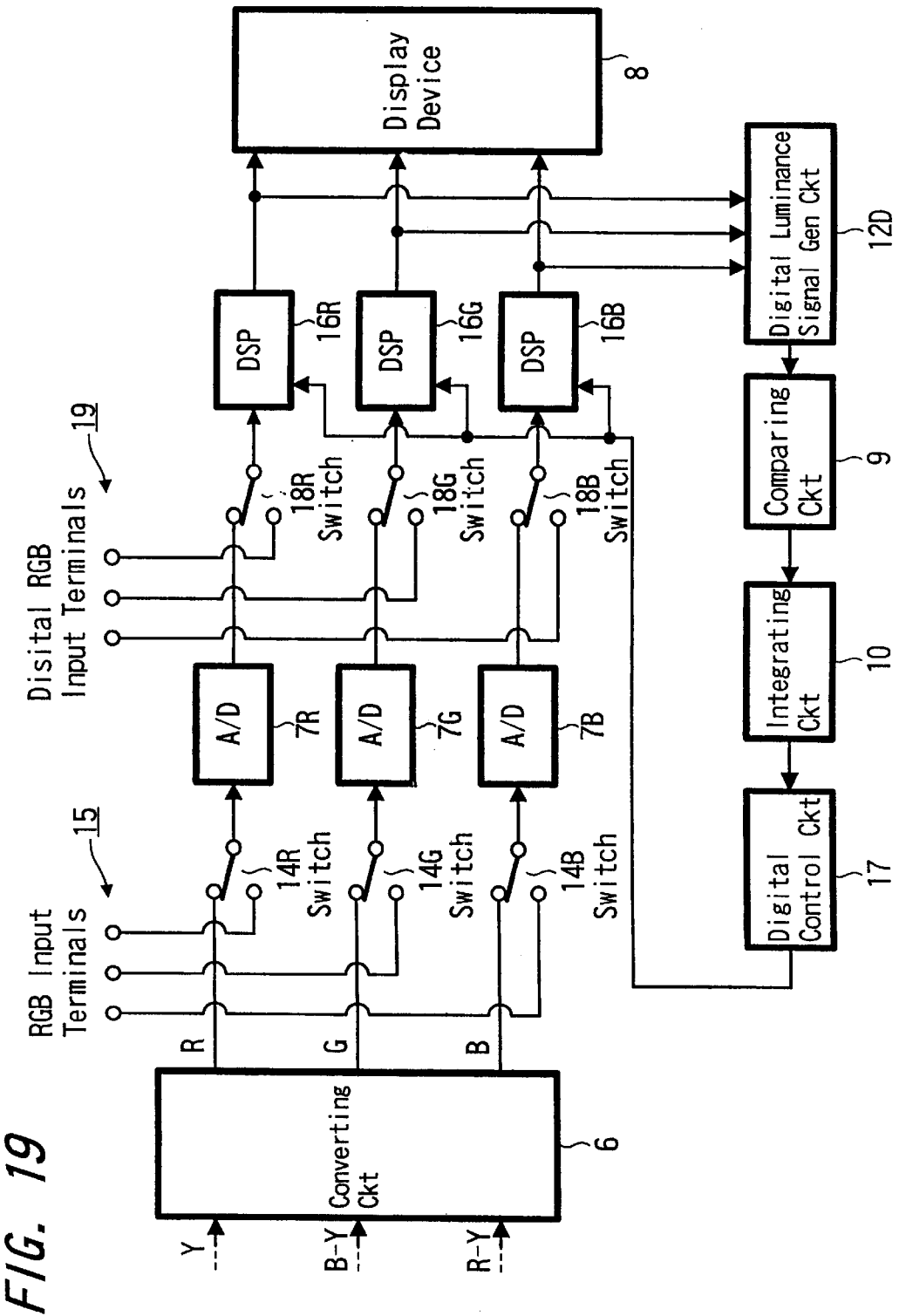
FIG. 19 is a block diagram showing a display device according to a sixteenth embodiment of the present invention.

Further, FIG. 19 is a block diagram showing a display device in which the digitally-converted three primary color signals of red (R), green (G), blue (B), for example, are respectively gamma-corrected according to a sixteenth embodiment of the present invention. Incidentally, also in FIG. 19, the circuit arrangement provided ahead of the converting circuit 6 is omitted for convenience sake of sheets of drawings, and the arrangement of this portion is similar to that of FIG. 16.

As shown in FIG. 19, the luminance signal (Y) and the two color-difference signals (R−Y), (B−Y) from the above-mentioned change-over switches 3Y, 3R, 3B (not shown) are each supplied to a converting circuit 6. Further, the three primary color signal of red (R), green (G), blue (B), for example, thus converted by this converting circuit 6 are respectively supplied to change-over switches 14R, 14G, 14B, in which they are respectively switched from signals from an RGB input terminal 15 to which three primary color signals (R/G/B), for example, arc respectively supplied independently.

The three primary color signals (R/G/B) from the change-over switches 14R, 14G, 14B are respectively supplied to A/D converting circuits 7R, 7G, 7B. Further, the thus digitally-converted three primary color signals (R/G/B) by the A/D converting circuits 7R, 7G, 7B are respectively supplied to change-over switches 18R, 18G, 18B, in which they are respectively switched from the signals from the RGB digital input terminals 19 to which the digitally-converted three primary color signals (R/G/B) are respectively supplied independently. Also, the digital three primary color signals (R/G/B) from the change-over switches 18R, 18G, 18B are respectively supplied to correction means (digital signal processors=DSP) 16R, 16G, 16B having gamma correction curves or the like controlled by an output control digital signal from a digital control circuit 17 which will be described later on.

Here, the digital signal processors (DSP) 16R, 16G, 16B are controlled by the output control digital signal from the digital control circuit 17, which will be described later on, in such a manner that gamma correction characteristic curves between input and output thereof are controlled as shown in FIG. 2, for example. Specifically, the digital signal processors 16R, 16G, 16B controlled in such a manner that the intermediate signal level of the gamma correction curve between input and output is increased from approximately a straight line in response to the magnitude of the output control digital signal as shown by an arrow in FIG. 2, for example. Then, the three primary color signals (R/G/B) from these digital signal processors (DSP) 16R, 16G, 16B are supplied to a display device 8 such as a plasma display or a liquid-crystal display.

Also, the corrected three primary color signals (R/G/B) from the above-mentioned digital signal processors (DSP) 16R, 16G, 16B are supplied to a digital luminance signal generating circuit 12D. Here, the three primary color signals (R/G/B) derived from the digital signal processors (DSP) 16R, 16G, 16B are digital signals in which a sampling frequency, for example, is 30 MHz and a quantization bit number is 8 bits (quantization value ranges from 0 to 255). Accordingly, the above-mentioned luminance signal generating circuit 12D generates a luminance signal (Y: digital value) by adding the three primary color signals (R/G/B) of the digital values with a predetermined ratio, e.g. with a ratio of Y=0.30R+0.59G+0.11B in the case of the NTSC system.

Further, the thus generated luminance signal (Y: digital value) is supplied to a comparing circuit 9, which compares a supplied luminance signal with an arbitrary reference level, e.g. quantization value 100, and thereby converted into a square-wave signal which goes to "0" when it is higher than the reference level and which goes to "1" when it is lower than the reference level. Then, an integrating circuit 10 integrates this square-wave signal to generate a signal (analog value) indicative of the average luminance level of the above-mentioned luminance signal (Y). Then, the signal indicative of the average luminance level from this integrating circuit 10 is supplied to the digital control circuit 17 which then generates the output control digital signal to control the above-mentioned digital signal processors (DSP) 16R, 16G, 16B. Further, the output control digital signal generated at this digital control circuit 17 is supplied to the digital signal processors (DSP) 16R, 16G, 16B.

As described above, according to this display device, the luminance signal (Y: digital value) is generated from the digital three primary color signals (R/G/B) supplied from the A/D converting circuits 7R, 7G, 7B or the RGB input terminals 19 through the change-over switches 18R, 18G, 18B. The average luminance level of this luminance signal (Y) is measured by the measuring means comprising the comparing circuit 9 and the integrating circuit 10. Further, the output control digital signal corresponding to the average luminance level measured by this measuring means is generated by the digital control circuit 17 and then supplied to the digital signal processors (DSP) 16R, 16G, 16B. Then, the gamma correction curves and the like of the above-mentioned digital signal processors (DSP) 16R, 16G, 16B are feedback-controlled in such a manner that the gamma correction between input and output becomes approximately a straight line when the average luminance level, for example, is large and that the intermediate signal level is increased, for example, when the average luminance level becomes small.

Accordingly, since this display device includes the measuring means for measuring the average luminance level of the video signal to be displayed and the gamma correction means for respective three primary color signals controlled by the output control signal from this measuring means, the gamma correction curves for the three primary color signals are respectively controlled in response to the average luminance level of the video signal to be displayed, whereby the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Since the digital processing is used, a more complex correction matched with the characteristics of the respective signals or the like may be carried out. At the same time, the display device according to this embodiment can cope with the RGB input terminals to which the three primary color signals are supplied independently.

Incidentally, in the above-mentioned display devices, when the external circuit arrangement includes a sub-contrast adjustment and a luminance level adjustment, such extra gains thereof may be appropriated for the gain control in the above-mentioned dynamic gamma circuit. Thus, it is possible to realize a display device of a simpler arrangement inexpensively.

Furthermore, the present invention is not limited the display device using the display means such as the plasma display or the liquid-crystal display, and may be applied to display devices using a cathode-ray tube and other display means.

Therefore, according to the first invention, since the display device includes measuring means for measuring an average luminance level of the luminance signal supplied from the separating circuit or video signal input terminal or the three primary color signals supplied from the converting circuit or the primary color signal input terminals or the digitally-converted three primary color signals supplied from the A/D converting means or digital input terminals and gamma correction means having a gamma correction curve controlled by an output control signal from the measuring means, the gamma correction curve is controlled in response to the average luminance level of the video signal to be displayed. Therefore, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

The problems with which the related-art display device encounters are that an image becomes difficult to see in the scene in which the object luminance level is low and that when the whole contrast is increased, in the scene in which only one portion is bright in the whole of the dark object, for example, this bright portion becomes the so-called white compression so that the gradation of this portion cannot be expressed. According to the present invention, it is possible to solve these problems with ease.

Also, according to the second invention, the measuring means comprises a comparing means for being supplied with an analog luminance signal from the separating circuit or the video signal input terminals as an input and for comparing the analog luminance signal with a predetermined level, an integrating circuit for integrating an output from the comparing circuit and a control circuit for generating the output control signal based on an integrated value from the integrating circuit. Thus, the analog luminance signal may be measured satisfactorily, and the satisfactory correction may be carried out.

Further, according to the third invention, the measuring means comprises an analog luminance signal generating circuit comprises for being supplied with analog three primary color signals supplied from the converting circuit or the primary color signal input terminals and for generating an analog luminance signal by adding the three primary color signals with a predetermined ratio, a comparing circuit for comparing the generated analog luminance signal with a predetermined level, an integrating circuit for integrating an output from the comparing circuit and a control circuit for generating the output control signal based on an integrated value from the integrating circuit. Thus, the analog three primary color signals may be measured satisfactorily, and the satisfactory correction may be carried out.

Also, according to the fourth invention, the measuring means comprises a digital luminance signal generating circuit for being supplied with the digitally-converted three primary color signals from the A/D converting means or the digital input terminals and for generating a digital luminance signal by adding the digitally-converted three primary color signals with a predetermined ratio, a comparing circuit for comparing the generated digital luminance signal with a predetermined level, an integrating circuit for integrating an output from the integrating circuit and a control circuit for generating the output control signal based on an integrated value from the integrating circuit. Thus, the digitally-converted three primary color signals may be measured satisfactorily, and the satisfactory correction may be carried out.

According to the fifth invention, since the gamma correction curve of the gamma correction means has a control characteristic such that the gamma correction curve becomes approximately a straight line when the level of the output control signal from the measuring means is large and that an intermediate signal level is increased as the level of the output control signal from the measuring means is lowered, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Also, according to the sixth invention, since the gamma correction means is provided with respect to the analog luminance signal from the separating circuit or the video signal input terminal, the output control signal from the measuring means is generated based on the analog luminance signal from the separating circuit or the video signal input terminal and the gamma correction means is feedforward-controlled by the output control signal from the measuring means, the gamma correction curve is controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Further, according to the seventh invention, since the gamma correction means is provided with respect to the analog luminance signal from the separating circuit or the video signal input terminal, the output control signal from the measuring means is generated based on the analog luminance signal from the gamma correction means, and the gamma correction means is feedback-controlled by the output control signal from the measuring means, the gamma correction curve is controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Further, according to the eighth invention, since the gamma correction means is provided with respect to the analog luminance signal from the separating circuit or the video signal input terminal, the output control signal from the measuring means is generated based on the analog these primary color signals outputted from the converting circuit and the gamma correction means is feedback-controlled by the output control signal from the measuring means, the gamma correction curve is controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Further, according to the ninth invention, since the gamma correction means is provided with respect to the analog luminance signal from the separating circuit or the video signal input terminal, the output control signal from the measuring means is generated based on the digitally-converted three primary color signals outputted from the A/D converting means and the gamma correction means is feedback-controlled by the output control signal from the measuring means, the gamma correction curve is controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily.

Also, according to the tenth invention, since the gamma correction means is provided with respect to the analog luminance signal supplied from the separating circuit or the video signal input terminal, color gain control means is provided in order to control levels of two color-difference signals comprising the video signal in response to the measured average luminance level, the output control signal from the measuring means is generated based on the analog luminance signal supplied from the separating circuit or the video signal input terminal and the gamma correction means and the color gain control means are feedforward-controlled by the output control signal from the measuring means, the gamma correction curve and the color gain are controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Moreover, the color gain may be controlled satisfactorily in response to the change of this luminance level.

Further, according to the eleventh invention, since the gamma correction means is provided with respect to the analog luminance signal supplied from the separating circuit or the video signal input terminal, color gain control means is provided in order to control levels of two color-difference signals comprising the video signal in response to the measured average luminance level, the output control signal from the measuring means is generated based on the analog luminance signal supplied from the gamma correction means and the gamma correction means and the color gain control means are feedback-controlled by the output control signal from the measuring means, the gamma correction curve and the color gain are controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Moreover, the color gain may be controlled satisfactorily in response to the change of this luminance level.

Further, according to the twelfth invention, since the gamma correction means is provided with respect to the analog luminance signal supplied from the separating circuit or the video signal input terminal, color gain control means is provided in order to control levels of two color-difference signals comprising the video signal in response to the measured average luminance level, the output control signal from the measuring means is generated based on the analog three primary color signals outputted from the converting means, and the gamma correction means and the color gain control means are feedback-controlled by the output control signal from the measuring means, the gamma correction curve and the color gain are controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Moreover, the color gain may be controlled satisfactorily in response to the change of this luminance level.

Further, according to the thirteenth invention, since the gamma correction means is provided with respect to the analog luminance signal supplied from the separating circuit or the video signal input terminal, color gain control means is provided in order to control levels of two color-difference signals comprising the video signal in response to the measured average luminance level, the output control signal from the measuring means is generated based on the digitally-converted three primary color signals outputted from the A/D converting means and the gamma correction means and the color gain control means are feedback-controlled by the output control signal from the measuring means, the gamma correction curve and the color gain are controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Moreover, the color gain may be controlled satisfactorily in response to the change of this luminance level.

According to the fourteenth invention, since the gamma correction means are respectively provided with respect to the three primary color signals outputted from the converting circuit, the output control signal from the measuring means is generated based on the analog luminance signal supplied from the separating circuit or the video signal input terminal and the gamma correction means are respectively feedforward-controlled by the output control signal from the measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily, and a more accurate correction may be carried out.

Also, according to the fifteenth invention, since the gamma correction means are respectively provided with respect to the three primary color signals outputted from the converting circuit or the primary color signal input terminals, the output control signal from the measuring means is generated based on the analog three primary color signals supplied from the converting circuit or the primary color signal input terminals and the gamma correction means are respectively feedforward-controlled by the output control signal from the measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily, and a more accurate correction may be carried out. Also, the display device according to the fifteenth invention may cope with the RGB input terminals to which the three primary color signals are supplied independently.

Further, according to the sixteenth invention, since the gamma correction means are respectively provided with respect to the three primary color signals supplied from the converting circuit or the primary color signal input terminals, the output control signal from the measuring means is generated based on the analog three primary color signals outputted from the gamma correction means and the gamma correction means are respectively feedback-controlled by the output control signal from the measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily, and a more accurate correction may be carried out. Also, the display device according to the sixteenth invention may cope with the RGB input terminals to which the three primary color signals are supplied independently.

Further, according to the seventeenth invention, since the gamma correction means are respectively provided with respect to the three primary color signals supplied from the converting circuit or the primary color signal input terminals, the output control signal from the measuring means is generated based on the digitally-converted three primary color signals outputted from the A/D converting means and the gamma correction means are respectively feedback-controlled by the output control signal from said measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily, and a more accurate correction may be carried out. Also, the display device according to the seventeenth invention may cope with the RGB input terminals to which the three primary color signals are supplied independently.

Further, according to the eighteenth invention, since the gamma correction means are respectively provided with respect to the digitally-converted three primary color signals outputted from the A/D converting means, the output control signal from the measuring means is generated based on the analog luminance signal supplied from the separating circuit or the video signal input terminals and the gamma correction means are respectively feedforward-controlled by the output control signal from the measuring means, the gamma correction curves of the three primary color signals are respectively controlled in response to the average luminance level of the video signal to be displayed, for example. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, since the digital processing is used, a more complex correction matched with the characteristics of the respective signals or the like may be carried out. Moreover, the display device according to the eighteenth invention may cope with the RGB input terminals to which the three primary color signals are supplied independently.

Further, according to the nineteenth invention, since the gamma correction means are respectively provided with respect to the digitally-converted three primary color signals outputted from the A/D converting means, the output control signal from the measuring means is generated based on the analog three primary color signals supplied from the converting circuit or the primary color input terminals and the gamma correction means are respectively feedforward-controlled by the output control signal from said measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, since the digital processing is used, a more complex correction matched with the characteristics of the respective signals or the like may be carried out. Moreover, the display device according to the nineteenth invention may cope with the RGB input terminals to which the three primary color signals are supplied independently.

Further, in accordance with the twentieth invention, since the gamma correction means are respectively provided with respect to the digitally-converted three primary color signals supplied from the A/D converting means or the digital input terminals, the output control signal from the measuring means is generated based on the digitally-converted three primary color signals supplied from the A/D converting means or the digital input terminals and the gamma correction means are respectively feedforward-controlled by the output control signal from the measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, since the digital processing is used, a more complex correction matched with the characteristics of the respective signals or the like may be carried out. Moreover, the display device according to the twentieth invention may cope with the RGB input terminals and the digital RGB input terminals to which the three primary color signals are supplied independently.

Furthermore, in accordance with the twenty-first invention, since the gamma correction means are respectively provided with respect to the three primary color signals supplied from the A/D converting means or the digital input terminals, the output control signal from the measuring means is generated based on the digital three primary color signals outputted from the gamma correction means and the gamma correction means are respectively feedback-controlled by the output control signal from the measuring means, the gamma correction curves of the three primary color signals are respectively controlled in response to the average luminance level of the video signal to be displayed. Thus, the intermediate luminance level increases in the scene in which a luminance level of an object is low to thereby make an image of a dark scene become easy to see. At the same time, in that case, since the maximum output of the video signal is held at the constant level, even in the scene in which one portion is bright in the whole of the dark object, a gradation of bright portion may be expressed satisfactorily. Also, since the digital processing is used, a more complex correction matched with the characteristics of the respective signals or the like may be carried out. Moreover, the display device according to the twenty-first invention may cope with the RGB input terminals and the digital RGB input terminals to which the three primary color signals are supplied independently.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A display device comprising:

a measuring means for measuring an average luminance level of a video signal;

a gamma correction means for correcting an output signal level of the video signal corresponding to an input signal level of the video signal responsive to a gamma correction curve, the gamma correction means changing the gamma correction curve responsive to the average luminance level by changing the gamma correction curve to being approximately linear when the average luminance level is a maximum value, and the gamma correction means changing the gamma correction curve to being curvilinear, with an intermediate portion of the gamma correction curve having a greater value than when the gamma correction curve is approximately linear, when the average luminance level is less than the maximum value; and a display means for displaying an image according to said output signal level of the video signal corrected by the gamma correction means.

2. A display device as claimed in claim 1, wherein said measuring means comprises a comparing circuit for comparing a luminance level of said video signal with a predetermined level and an integrating circuit for integrating an output from said comparing circuit, and a control circuit for generating a control signal for controlling the gamma correction means based on an integrated value from said integrated circuit.

3. A display device as claimed in claim 1, wherein said measuring means measures said average luminance level of said video signal which is supplied to said gamma correction means, and said gamma correction means is feedforward controlled by said a control signal from said measuring means.

4. A display device as claimed in claim 1, wherein said measuring means measures said average luminance level of said video signal which is supplied from said gamma correction means, and said gamma correction means is feedback controlled by a control signal from said measuring means.

5. A display device as claimed in claim 1, further comprising:

a separating circuit for separating said video signal to provide a luminance signal and color difference signals; and a color gain control means for controlling gains for said color difference signals according to said average luminance level based on said luminance signal measured by said measuring means.

6. A display device as claimed in claim 5, wherein said gains of said color difference signals are controlled to increase when said average luminance level is increased.

* * * * *